United States Patent
Wei et al.

(10) Patent No.: US 9,373,190 B2
(45) Date of Patent: Jun. 21, 2016

(54) HIGH-QUALITY STEREO RECONSTRUCTION FEATURING DEPTH MAP ALIGNMENT AND OUTLIER IDENTIFICATION

(71) Applicant: Google Inc., Mountain View, CA (US)

(72) Inventors: Xiaolin Wei, Fremont, CA (US); Aleksey Golovinskiy, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/327,094

(22) Filed: Jul. 9, 2014

(65) Prior Publication Data

US 2016/0012633 A1    Jan. 14, 2016

(51) Int. Cl.
*G06T 17/05*     (2011.01)

(52) U.S. Cl.
CPC ......... *G06T 17/05* (2013.01); *G06T 2219/2004* (2013.01)

(58) Field of Classification Search
CPC ............... G06T 2207/10028; G06T 7/0075; G06T 7/2046; G06T 2207/20144; G06T 2207/10021; G06T 2207/10012; G06T 17/00; G06T 15/00; G06T 5/50; G06T 2200/04; G06T 7/0046; G06T 17/10; G06T 2207/30244; G06T 15/205; G06T 7/0065; G06T 2207/20221; G06T 7/0077; G06T 15/08; G06T 7/004; G06T 7/0057; G06T 15/20; G06T 17/05; G06T 17/2207
See application file for complete search history.

(56) References Cited

U.S. PATENT DOCUMENTS

| 8,553,942 | B2 | 10/2013 | Lynch |
|---|---|---|---|
| 8,558,832 | B1* | 10/2013 | Cook et al. .................... 345/422 |
| 8,711,206 | B2 | 4/2014 | Newcombe et al. |
| 2009/0022393 | A1* | 1/2009 | Bar-Zohar ............ G06T 7/0075 382/154 |
| 2012/0249730 | A1* | 10/2012 | Lee ................................. 348/38 |
| 2013/0060540 | A1 | 3/2013 | Frahm et al. |
| 2013/0101175 | A1* | 4/2013 | Lynch ........................... 382/106 |
| 2013/0244782 | A1 | 9/2013 | Newcombe et al. |
| 2015/0109415 | A1* | 4/2015 | Son ........................ G01B 11/22 348/46 |
| 2015/0160343 | A1* | 6/2015 | Zweigle et al. |
| 2015/0279083 | A1* | 10/2015 | Pradeep .................. G06T 15/08 345/419 |

OTHER PUBLICATIONS

Low, Kok-Lim, "Linear Least-Squares Optimization for Point-to-Plane ICP Surface Registration", Technical Report TR04-004, Dept. of Computer Science, University of North Carolina at Chapel Hill, Feb. 2004, 3 pages.

(Continued)

*Primary Examiner* — Jeffrey Chow
(74) *Attorney, Agent, or Firm* — Dority & Manning, P.A.

(57) ABSTRACT

A novel stereo reconstruction pipeline that features depth map alignment and outlier identification is provided. One example method includes obtaining a plurality of images depicting a scene. The method includes determining a pose for each of the plurality of images. The method includes determining a depth map for each of the plurality of images such that a plurality of depth maps are determined. Each of the plurality of depth maps describes a plurality of points in three-dimensional space that correspond to objects in the scene. The method includes aligning the plurality of depth maps by transforming one or more of the plurality of depth maps so as to improve an alignment between the plurality of depth maps. The method includes identifying one or more outlying points. The method includes generating a three-dimensional model of the scene based at least in part on the plurality of depth maps.

20 Claims, 14 Drawing Sheets

(56) References Cited

OTHER PUBLICATIONS

Nishino et al., "Robust Simultaneous Registration of Multiple Range Images", ACCV2002: The 5th Asian Conference on Computer Vision, Melbourne, Australia, Jan. 23-25, 2002, 8 pages.

Lhuilier et al., "Robust Dense Matching using Local and Global Geometric Constraints", 15th International Conference on Pattern Recognition, Sep. 2000, 968-972.

Chen et al., "Scalable Real-Time Volumetric Surface Reconstruction", ACM Transactions on Graphics, SIGGRAPH 2013 Conference, vol. 32, Jul. 4, 2013, 10 pages.

Rusinkiewicz et al., Efficient Variants of the ICP Algorithm:, 3rd International Conference on 3-D Digital Imaging and Modeling, 2001, 145-152.

Cupec et al., "Fast 2.5D Mesh Segmentation to Approximately Convex Surfaces", Proceedings of the 5th European Conference on Mobile Robots, ECMR 2011, Orebro, Sweden, Sep. 7-9, 2011, 6 pages.

Dorai et al., "Registration and Integration of Multiple Object Views for 3D Model Construction", IEEE Transactions on Pattern Analysis and Machine Intelligence, vol. 20, Jan. 1, 1998, 7 pages.

Chen et al., "Object Modeling by Registration of Multiple Range Images", Proceedings of the 1991 IEEE International Conference on Robotics and Automation, Sacramento, CA, Apr. 1991, 2724-2729.

Zheng et al., "Efficient and Scalable Depthmap Fusion", Proceedings British Machine Vision Conference 2012, Surrey GB, Sep. 2012, 12 pages.

Blais et al., "Registering Multiview Range Data to Create 3D Computer Objects", IEEE Transactions on Pattern Analysis and Machine Intelligence, vol. 17, Aug. 8, 1995, 820-824.

Curless et al., "A Volumetric Method for Building Complex Models from Range Images", Proceedings of the 23rd Annual Conference on Computer Graphics and Interactive Techniques, New Orleans, LA, Aug. 1996, 303-312.

Pears et al, "From 3D Point Clouds to Pose-Normalised Depth Maps", Int J Comput Vis, 89, 2010, 152-176.

Castellani et al., "Registration of Multiple Acoustic Range Views for Underwater Scene Reconstruction", Computer Vision and Image Understanding, 87, 2002, 78-89.

* cited by examiner

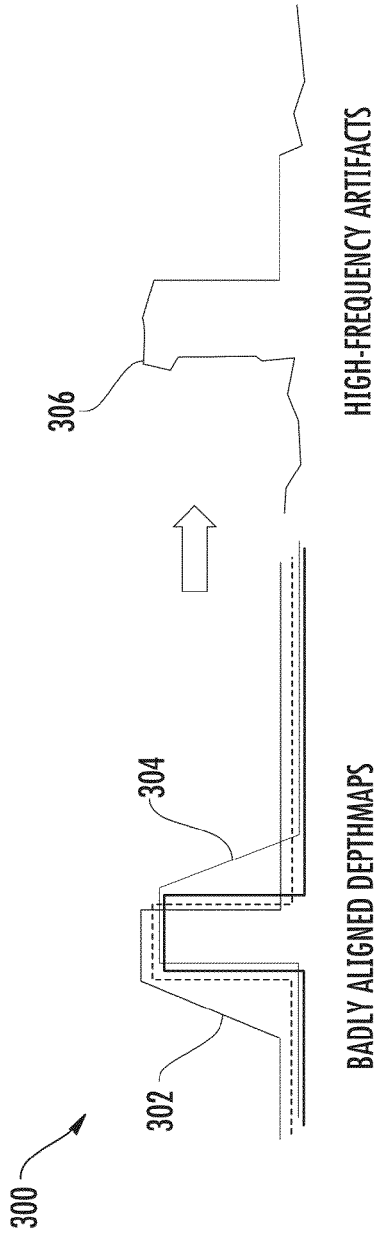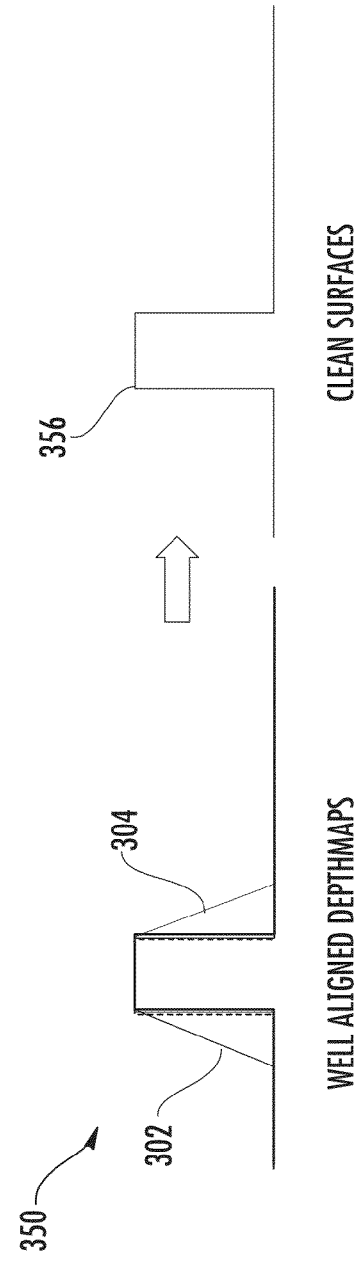

HIGH-QUALITY STEREO RECONSTRUCTION FEATURING DEPTH MAP ALIGNMENT AND OUTLIER IDENTIFICATION

FIELD

The present disclosure relates generally to generating three-dimensional models. In particular, the present disclosure is directed to a novel stereo reconstruction pipeline that features depth map alignment and outlier identification.

BACKGROUND

The accurate reconstruction of three-dimensional shapes and scenes from imagery is an important and quickly advancing field of computer vision. In particular, stereo reconstruction and other associated algorithms can be used as part of a processing pipeline for automatically reconstructing a three-dimensional model of a scene from a set of two-dimensional input images that depict the scene. Such reconstruction functionality has broad application, including, but not limited to, three-dimensional mapping and navigation, augmented and virtual reality, three-dimensional content modeling for games and/or films, and other applications.

However, one problem experienced by certain existing stereo reconstruction pipelines is that errors introduced during early stages of the pipeline are carried on and amplified by subsequent stages of the pipeline. Cascading and amplification of initial errors can cause the final reconstruction results to be significantly deteriorated.

Therefore, processing pipelines that include stages for minimizing or otherwise identifying and eliminating errors or other inaccuracies are needed.

SUMMARY

Aspects and advantages of the present disclosure will be set forth in part in the following description, or may be apparent from the description, or may be learned through practice of embodiments of the present disclosure.

One example aspect of the present disclosure is directed to a computer-implemented method for generating three-dimensional models. The method includes obtaining, by one or more computing devices, a plurality of images depicting a scene. The method includes determining, by the one or more computing devices, a pose for each of the plurality of images. The method includes determining, by the one or more computing devices, a depth map for each of the plurality of images such that a plurality of depth maps are determined. Each of the plurality of depth maps describes a plurality of points in three-dimensional space that correspond to objects in the scene. The method includes aligning, by the one or more computing devices, the plurality of depth maps by transforming one or more of the plurality of depth maps so as to improve an alignment between the plurality of depth maps. The method includes, after aligning the plurality of depth maps, identifying, by the one or more computing devices, one or more of the plurality of points described by one or more of the plurality of depth maps as one or more outlying points. The method includes generating, by the one or more computing devices, a three-dimensional model of the scene based at least in part on the plurality of depth maps.

Another example aspect of the present disclosure is directed to one or more non-transitory computer-readable media storing instructions that, when executed by one or more processors, cause the one or more processors to perform operations. The operations include obtaining a plurality of depth maps. Each of the plurality of depth maps describes a plurality of points in three-dimensional space that respectively correspond to locations of objects in a scene. The operations include iteratively transforming the plurality of depth maps to iteratively minimize an objective function, such that an alignment of the plurality of depth maps is improved. The operations include identifying one or more of the plurality of points of one or more of the plurality of depth maps as outlying points and reducing an influence of each of the outlying points on the generation of a three-dimensional model from the plurality of depth maps. The objective function comprises a sum, for all of a plurality of pairs of the depth maps that overlap one another, of a plurality of squared distances respectively between one or more of the plurality of points described by a source depth map of each pair of depth maps and one or more planes respectively associated with one or more of the plurality of points described by a target depth map of such pair of depth maps. The objective function allows for transformation of both the source depth map and the target depth map for each pair of depth maps.

Another example aspect of the present disclosure is directed to a computing system. The computing system includes one or more computing devices respectively comprising one or more processors. The computing system includes one or more non-transitory computer-readable media storing instructions that, when executed by the one or more processors, cause the one or more computing devices to perform operations. The operations include bundle adjusting a plurality of images depicting a scene to obtain a pose for each image. The operations include performing a stereo algorithm to obtain a depth map for each image, such that a plurality of depth maps are obtained. Each depth map describes locations of a plurality of points in three-dimensional space. The operations include aligning the plurality of depth maps by iteratively minimizing an objective function. The objective function comprises a distance term that sums, for all of the plurality of depth maps, a plurality of squared point-to-plane distances. The distance term allows transformation of both a source depth map and a target depth map for each of a plurality of pairs of the depth maps. The operations include identifying one or more of the plurality of points described by one or more of the plurality of depth maps as outlying points. The operations include reducing a confidence score associated with each of the outlying points. The operations include merging the plurality of depth maps to generate a signed distance function for the scene. The merging is based at least in part on the confidence scores. The operations include generating a mesh model of the scene based at least in part on the signed distance function.

These and other features, aspects, and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling description of the present disclosure, directed to one of ordinary skill in the art, is set forth in the specification, which makes reference to the appended figures, in which:

FIGS. 3A and 3B depict simplified example representations of depth maps according to an example embodiment of the present disclosure;

DETAILED DESCRIPTION

Overview

Figure 1:
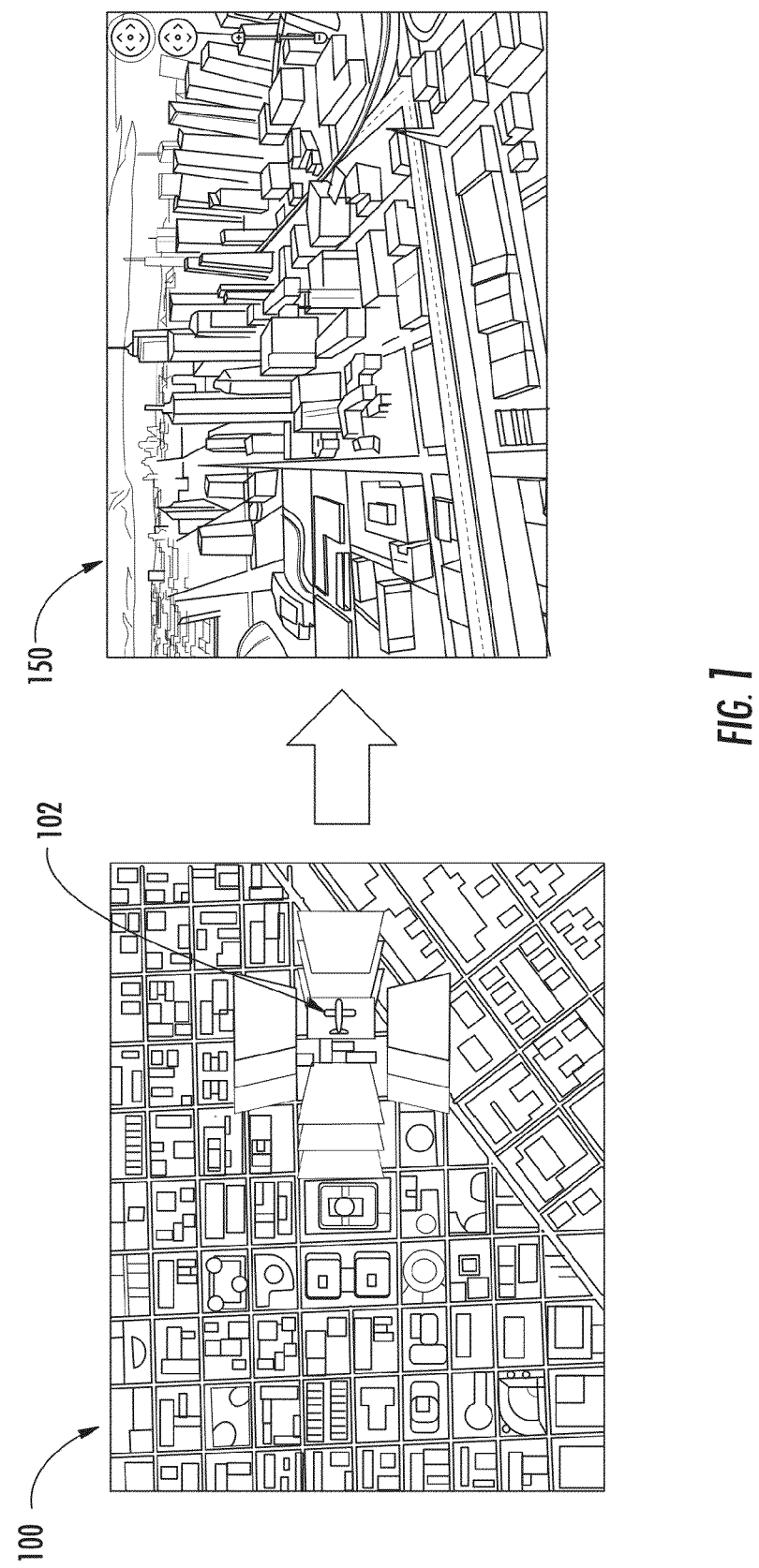
FIG. 1 depicts an example two-dimensional image being used to generate an example rendering of a three-dimensional model according to an example embodiment of the present disclosure.

Generally, the present disclosure is directed to generating three-dimensional models. In particular, a processing pipeline that uses depth map alignment and outlier identification can be applied to a plurality of images that depict a scene to generate a three-dimensional model of the scene. As an example, a plurality of depth maps can be respectively determined for the plurality of images. Each depth map can describe a plurality of points in three-dimensional space that correspond to objects in the scene. The plurality of depth maps can be aligned by, for example, transforming one or more of the plurality of depth maps so as to improve the alignment between the depth maps. After aligning the depth maps, one or more of the points described by one or more of the depth maps can be identified as outlying points. After depth map alignment and outlier identification, a three-dimensional model can then be constructed based at least in part on the depth maps having the improved alignment.

More particularly, the systems and methods of the present disclosure can be applied to a plurality of images depicting a scene to generate a three-dimensional model of the scene. For example, the scene may be a singular object such as a building or may be a large-scale scene such as entire city or, in some embodiments, the entire surface of the Earth. The images can be any suitable form of images, including, for example, satellite imagery, aerial imagery collected from an aircraft, user-uploaded photographs, other imagery, or combinations thereof.

A pose can be determined for each of the images. For example, the pose for each image can describe a location and orientation in three-dimensional space at which such image was captured. The pose for each image can be obtained from the device of capture (e.g. if the camera or other image capture device had accurate knowledge of its pose at the time of capture) or can be derived or otherwise improved through an analysis of the plurality of images.

As an example, in some embodiments, a bundle adjustment algorithm can be performed to initially determine or refine the pose for each image. For example, a structure-from-motion algorithm can be used to solve for or otherwise determine a pose for each image based on two-dimensional feature matches. In some embodiments, both intrinsic and extrinsic camera parameters can be determined though bundle adjustment.

After a pose has been determined for each image, a stereo matching algorithm can be performed to respectively obtain a plurality of depth maps for the plurality of images. In particular, the depth map determined for each image can inherit the pose from such image. Further, each depth map can describe a plurality of points in three-dimensional space that correspond to objects in the scene. For example, each depth map can provide a depth for each of a plurality of points (e.g. for each of the pixels of the corresponding image) relative to the pose associated with such depth map.

As an example, a dense stereo algorithm can be performed to obtain a depth map for each image. For example, the dense stereo algorithm can include or leverage a graph cutting algorithm or a plane-sweep stereo algorithm.

According to an aspect of the present disclosure, the plurality of depth maps can be aligned to improve their accuracy and correct errors resulting from inaccurate poses. In particular, one or more of the depth maps can be transformed (e.g. rotated and/or translated within six degrees of freedom) to improve the alignment among the depth maps.

In some embodiments of the present disclosure, the plurality of depth maps can be aligned by transforming one or more of the plurality of depth maps so as to minimize an objective function describing the alignment between the plurality of depth maps. As an example, the objective function can be iteratively minimized to iteratively improve the alignment. For example, in some embodiments, a customized variant of an iterative closest point optimization (or improvement) technique can be performed to align the depth maps.

According to an aspect of the present disclosure, in some embodiments, all of the depth maps may be simultaneously aligned. As an example, the objective function can include a distance term that considers all of the plurality of depth maps together by summing across a plurality of pairs of the depth maps. For example, each pair of depth maps that exhibit some overlap in their corresponding depicted portions of the scene can be considered together as a pair by the distance term. Each pair of depth maps can consist of a source depth map and a target depth map.

More particularly, in some embodiments, the distance term can be a sum, across all of the pairs of depth maps, of a plurality of squared point-to-plane distances associated with each pair of depth maps. As an example, the distance term can be a sum, for all of the pairs of depth maps, of a plurality of squared distances respectively between one or more of the plurality of points described by the source depth map of each pair of depth maps and one or more planes respectively associated with one or more of the plurality of points described by the target depth map of such pair of depth maps. Thus, for each instance in which the objective function is minimized, the alignment can be simultaneously improved for all depth maps.

According to another aspect of the present disclosure, the objective function can allow for simultaneous transformation of all of the plurality of depth maps. As an example, the target depth map can be permitted to be transformed in addition to transformation of the source depth map. For example, the point-to-plane distances can be calculated based on a variable transformation of both the source depth map and the target depth map for each pair of depth maps. Thus, by minimizing the objective function, all of the depth maps may be simultaneously transformed to improve the alignment for all depth maps.

According to yet another aspect of the present disclosure, each depth map can be transformed relative to its own local coordinate system rather than a common global coordinate system. As an example, the source depth map and the target depth map can both be transformed in the distance term relative to their respective local coordinate systems and then converted from the local coordinate system to a global coordinate system. In such fashion, numerical instability can be reduced.

According to another aspect of the present disclosure, the objective function can also include a regularization term. The regularization term can describe an amount of transformation (e.g. an amount of rotation and an amount of translation) applied to each of the plurality of depth maps. In particular, because each depth map is permitted to be transformed, the regularization term can be used to penalize and, therefore, reduce, global movement (e.g. global drift) across all depth maps.

Furthermore, in some embodiments of the present disclosure, only a random subset of points described by each depth map can be considered by the objective function. By employing a random subset, the number of point pairs to be considered can be reduced, thereby reducing processing requirements and allowing application of the present disclosure to larger scale scenes.

As an example, only a random subset of points for each source depth map can be considered. For each of such random subset of points, the closest point of the target depth map can be used to provide the point-to-plane distance. In particular, a normal at each closest point of the target depth map can be used to project a point-to-plane distance. The normal can be determined based at least in part on the locations of surrounding points of the target depth map.

As discussed above, the objective function can be iteratively minimized so that the depth map alignment is iteratively improved. The iterative process can be ended according to various criteria, including, for example, when a certain threshold number of iterations have been performed; when the residual is less than a threshold number; when the iteration-over-iteration change in the residual is less than a threshold number; or some other criteria or combinations thereof.

After the depth maps have been aligned, a pointwise outlier identification process can be performed. In particular, the outlier identification process can assist in reducing or otherwise correcting depth map errors introduced during stereo matching.

As an example, in some embodiments, outlying points can be identified by determining, for each point described by one of the plurality of depth maps, a number of points described by other depth maps that are within a threshold distance from such point. Outlying points can be identified based at least in part on such number of surrounding points.

In particular, as an example, a number of other depth maps represented by the surrounding points can be determined If the number of depth maps is less than a threshold number, the point can be designated as an outlying point.

In some embodiments, outlying points can be removed. In other embodiments, a confidence score associated with each outlying point can be reduced by a certain percentage. The confidence scores can be employed in subsequent model construction steps. Therefore, reducing the confidence scores of outlying points can reduce their influence on resulting model.

More particularly, after depth map alignment and outlier identification, a three-dimensional model can be generated based at least in part on the plurality of depth maps. In particular, as an example, a volumetric fusion technique can be performed to merge the plurality of depth maps. For example, the volumetric fusion technique can average a plurality of signed distance functions respectively associated with the plurality of depth maps to generate a unified signed distance function for a volume enclosing the scene.

As an example, the plurality of depth maps can be merged by averaging, for each of a plurality of locations (e.g. voxels in a volume), a plurality of voxel-to-surface distances respectively provided by the plurality of depth maps. For example, ray casting or other techniques can be used to determine a voxel-to-surface distance for each location for each depth map (e.g. by casting a ray from a perspective of each depth map in the direction of the voxel until it intersects a point described by such depth map and then determining a distance between the voxel and the intersected point). In some embodiments, interpolation of points can be performed if the ray does not directly intersect a point.

In addition, in some embodiments, a weighted average of the voxel-to-surface distances can be determined In particular, the confidence scores of the points intersected by the rays can impact or be used as the weightings for the weighted average computation. Thus, the influence of outlying points on the resulting signed distance function can be reduced. Other volumetric fusion techniques can be performed as well, including per-voxel Boolean voting schemes in which the weight of a vote provided by each depth map is influenced by the confidence scores.

After the depth maps have been merged, a mesh model can be generated. For example, the mesh model can be generated based at least in part on a signed distance function generated by the volumetric fusion technique. As an example, marching cubes or other similar techniques can be performed to generate a three-dimensional polygonal mesh model.

In further embodiments, the mesh model can be textured. For example, texture from the images can be applied to the mesh model. In some embodiments, updated poses for each of the images can be fed back from the aligned depth maps to improve the accuracy of the texturing. In other embodiments, poses can be scored based on the alignment results and the pose scores can be used to improve a graphcut texturing technique.

Thus, the present disclosure provides a novel pipeline for generating three-dimensional models from imagery. In particular, depth map alignment and outlier identification can be used to reduce errors introduced by previous pipeline steps. By improving the depth map alignment and reducing the influence of outliers, the resulting three-dimensional model will be more accurate, less noisy, and exhibit cleaner surfaces with fewer artifacts.

Example Input Image and Model Rendering

FIG. 1 depicts an example two-dimensional image 100 that may be used to generate an example rendering 150 of a three-dimensional model according to an example embodiment of the present disclosure. More particularly, the systems and methods of the present disclosure can be applied to a plurality of images depicting a scene to generate a three-dimensional model of the scene. For example, the scene may be a singular object such as a building or may be a large-scale scene such as entire city or, in some embodiments, the entire surface of the Earth.

The images can be any suitable form of images, including, for example, satellite imagery, aerial imagery collected from an aircraft (e.g. as illustrated by aircraft icon 102), user-uploaded photographs, other imagery, or combinations thereof. Some images may include metadata indicating a pose or location of image capture while other images may not.

The plurality of images of the scene (e.g. including image 100) can be used to generate a three-dimensional model of the scene. Furthermore, an application or other computing program can allow a user to navigate about the three-dimensional model to receive renderings of the model from various viewpoints (e.g. rendering 150). Thus, the systems and methods of the present disclosure can be implemented to automatically transform two-dimensional imagery into an interactive and navigable three-dimensional model.

Example Methods

Figure 2:
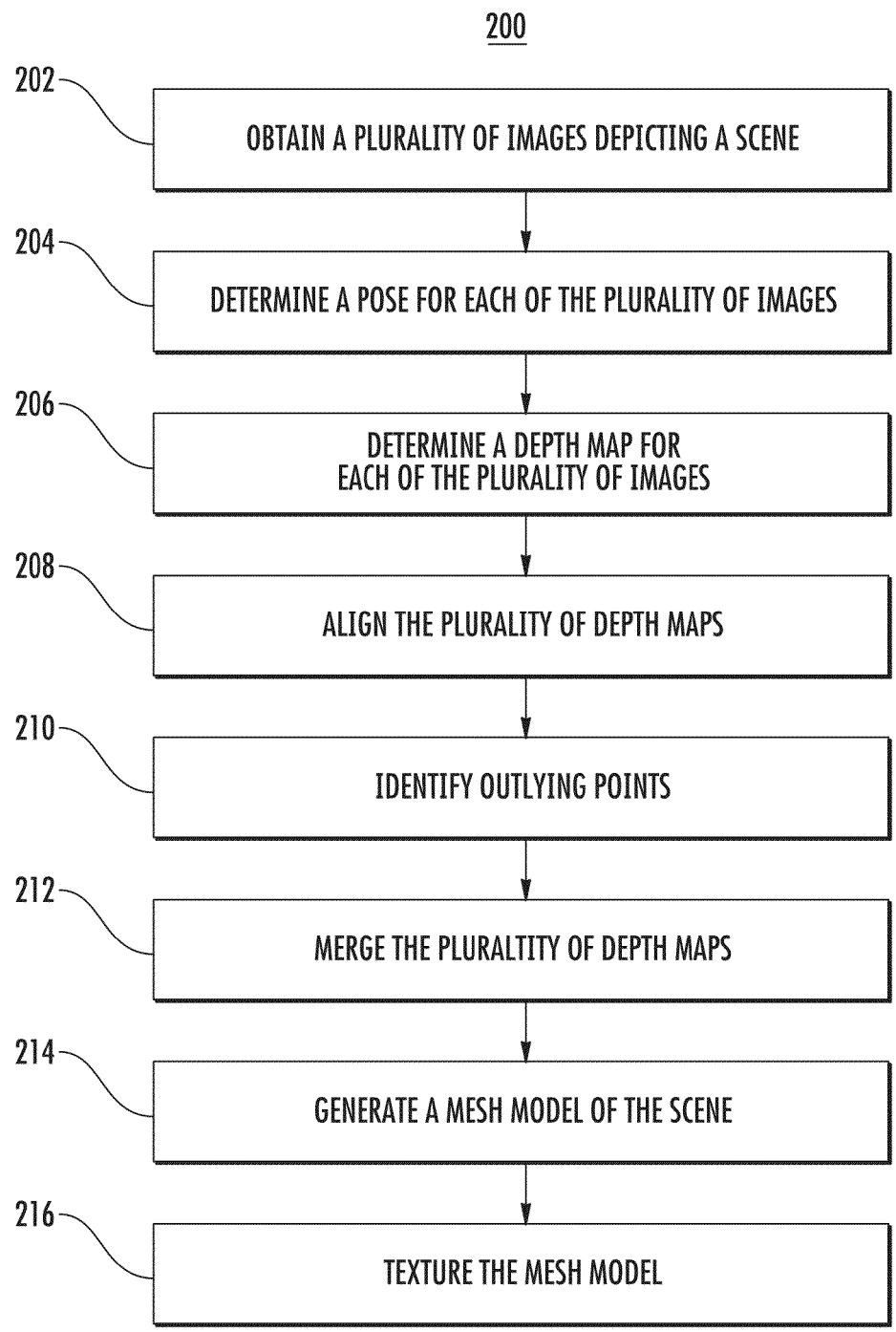
FIG. 2 depicts a flow chart of an example method for generating a three-dimensional model according to an example embodiment of the present disclosure.

FIG. 2 depicts a flow chart of an example method (200) for generating a three-dimensional model according to an example embodiment of the present disclosure. Method (200) can be implemented using any suitable computing system, including, for example, system 1400 of FIG. 14.

In addition, although FIG. 2 depicts steps performed in a particular order for purposes of illustration and discussion, the methods discussed herein are not limited to any particular order or arrangement. One skilled in the art, using the disclosures provided herein, will appreciate that various steps of method (200) can be omitted, rearranged, combined, and/or adapted in various ways without deviating from the scope of the present disclosure.

At (202) a plurality of images depicting a scene can be obtained. The images can be any suitable form of images, including, for example, satellite imagery, aerial imagery collected from an aircraft, user-uploaded photographs, other imagery, or combinations thereof. The images can have been preselected or otherwise previously grouped as input for model generation and can simply be obtained from memory at (202). Alternatively, at (202) the images can be screened or otherwise analyzed and selected for inclusion as input imagery.

At (204) a pose can be determined for each of the plurality of images obtained at (202). For example, the pose for each image can describe a location and orientation in three-dimensional space at which such image was captured.

In some embodiments, the pose for each image can be obtained from the device of capture. For example, the camera or other image capture device (e.g. aerial image capture device) may have had accurate or semi-accurate knowledge of its pose at the time of capture. For example, such image capture device may have been operatively connected with accelerometers, GPS devices, magnetic or dead reckoning localization modules, other pose determination functionality, or combinations thereof for the purpose of providing pose information for each image captured (e.g. stored as metadata along with the imagery).

Alternatively, the pose for one or more of the images can be wholly derived or improved through an analysis of the plurality of images. As an example, in some embodiments, a bundle adjustment algorithm can be performed a (204) to initially determine or refine the pose for each image. For example, a structure-from-motion algorithm can be used to solve for or otherwise determine a pose for each image based on two-dimensional feature matches. In some embodiments, both intrinsic and extrinsic camera parameters can be determined though bundle adjustment.

At (206) a depth map can be determined for each of the plurality of images. As an example, a stereo matching algorithm can be performed to respectively obtain a plurality of depth maps for the plurality of images. In particular, the depth map determined for each image can inherit the pose from such image. Further, each depth map can describe a plurality of points in three-dimensional space that correspond to physical objects in the scene. For example, each depth map can provide a depth for each of a plurality of points (e.g. for each of the pixels of the corresponding image) relative to the pose associated with such depth map.

In some embodiments, a dense stereo algorithm can be performed to obtain a depth map for each image. For example, the dense stereo algorithm can include or leverage a graph cutting algorithm or a plane-sweep stereo algorithm.

At (208) the plurality of depth maps can be aligned. In particular, at (208) one or more of the depth maps can be transformed (e.g. rotated and/or translated within six degrees of freedom) to improve the alignment among the depth maps.

As a simplified visual example, FIGS. 3A and 3B depict simplified example representations of depth maps according to an example embodiment of the present disclosure. In particular, FIG. 3A provides a simplified representation 300 of a plurality of depth maps (e.g. depth maps 302 and 304) that are poorly aligned. For example, the depth maps 302 and 304 neither accurately correspond to the object being modeled nor exhibit significant agreement with each other. As depicted by FIG. 3A, use of the poorly aligned depth maps to generate a three-dimensional model will result in a three-dimensional model 306 that includes a significant number of high-frequency artifacts and other errors.

However, FIG. 3B provides a simplified representation 350 of the plurality of depth maps (e.g. depth maps 302 and 304) that have been aligned according to the present disclosure. In particular, the depth maps 302 and 304 exhibit both an improved correspondence to the object being modeled and an increased agreement with each other. Thus, as depicted by FIG. 3B, use of the depth maps having the improved alignment to generate the three-dimensional model will results in a three-dimensional model 356 that includes clean surfaces and a smaller number of errors.

It should be appreciated that representations 300 and 350 are simplified for the purpose of providing examples and explanation of the present disclosure. Thus, although the depth maps depicted in FIGS. 3A and 3B are two-dimensional in nature, the present disclosure can be applied to depth maps describing points in three-dimensional space. For example, each depth map can have a pose (e.g. position and orientation) in three-dimensional space and can provide a depth from such pose for each of the plurality of points. For example, a depth can be provided for each pixel of a depth map image.

Referring again to FIG. 2, in some embodiments of the present disclosure, the plurality of depth maps can be aligned at (208) by transforming one or more of the plurality of depth maps so as to minimize an objective function describing the alignment between the plurality of depth maps. As an example, the objective function can be iteratively minimized to iteratively improve the alignment. For example, in some embodiments, a customized variant of an iterative closest point optimization (or improvement) technique can be performed to align the depth maps.

Figure 4:
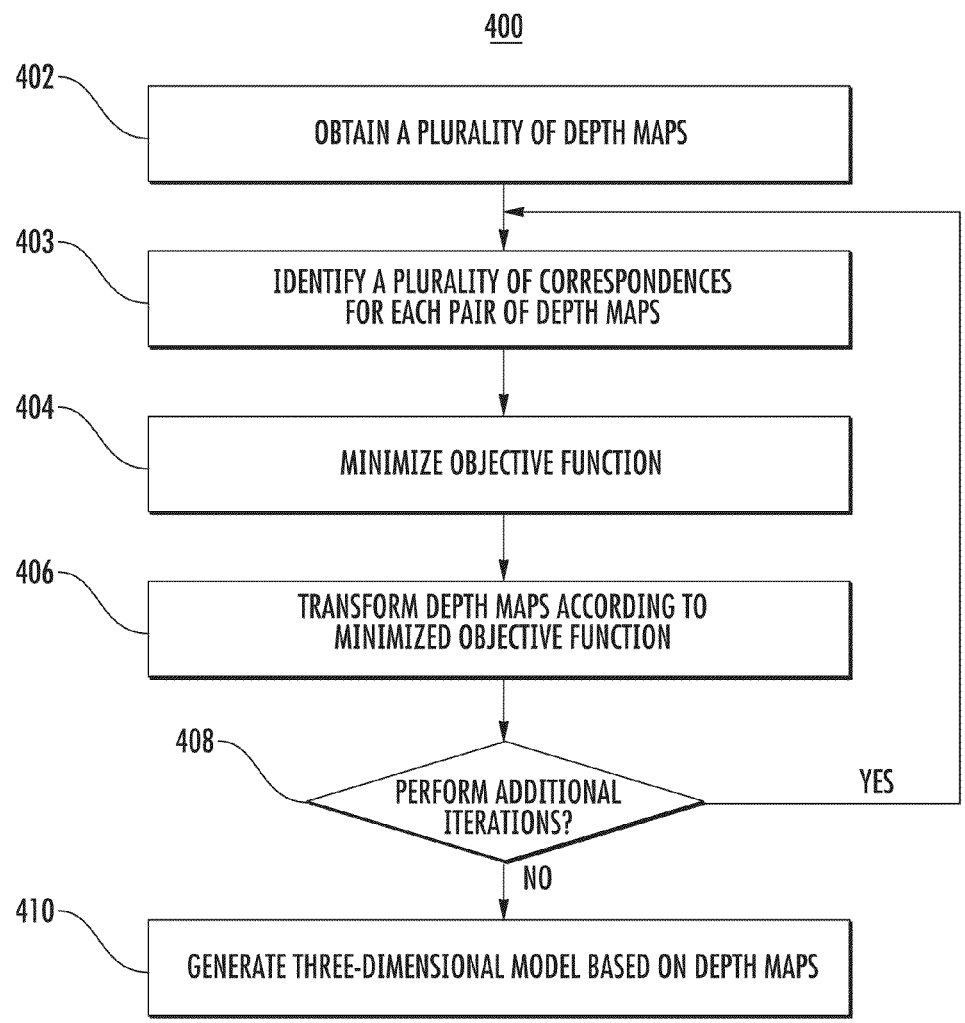
FIG. 4 depicts a flow chart of an example method for aligning depth maps according to an example embodiment of the present disclosure.

As one example alignment technique of the present disclosure, FIG. 4 depicts a flow chart of an example method for aligning depth maps according to an example embodiment of the present disclosure. Method (400) can be implemented using any suitable computing system, including, for example, system 1400 of FIG. 14.

In addition, although FIG. 4 depicts steps performed in a particular order for purposes of illustration and discussion, the methods discussed herein are not limited to any particular order or arrangement. One skilled in the art, using the disclosures provided herein, will appreciate that various steps of method (400) can be omitted, rearranged, combined, and/or adapted in various ways without deviating from the scope of the present disclosure.

At (402) a plurality of depth maps can be obtained. As an example, the depth maps can be obtained from memory at (402). For example, the depth maps may have been created according to (202)-(206) of method (200) or according to other suitable methods or techniques and then stored in memory for access by a processing module implementing method (400).

At (403) a plurality of correspondences between each of a plurality of pairs of depth maps can be identified. More particularly, in some embodiments, the plurality of depth maps obtained at (402) can be organized into a plurality of pairs of depth maps. For example, each pair of depth maps that exhibit some overlap in their corresponding portions of the scene can be considered together as a pair. Each pair of depth maps can consist of a source depth map and a target depth map. At (403) a plurality of correspondences between each of such pairs can be identified. Each correspondence can consist of a pair of points (e.g. one point from the source depth map and one point from the target depth map) that are close in distance and likely to correspond to the same object in the scene.

Figure 5:
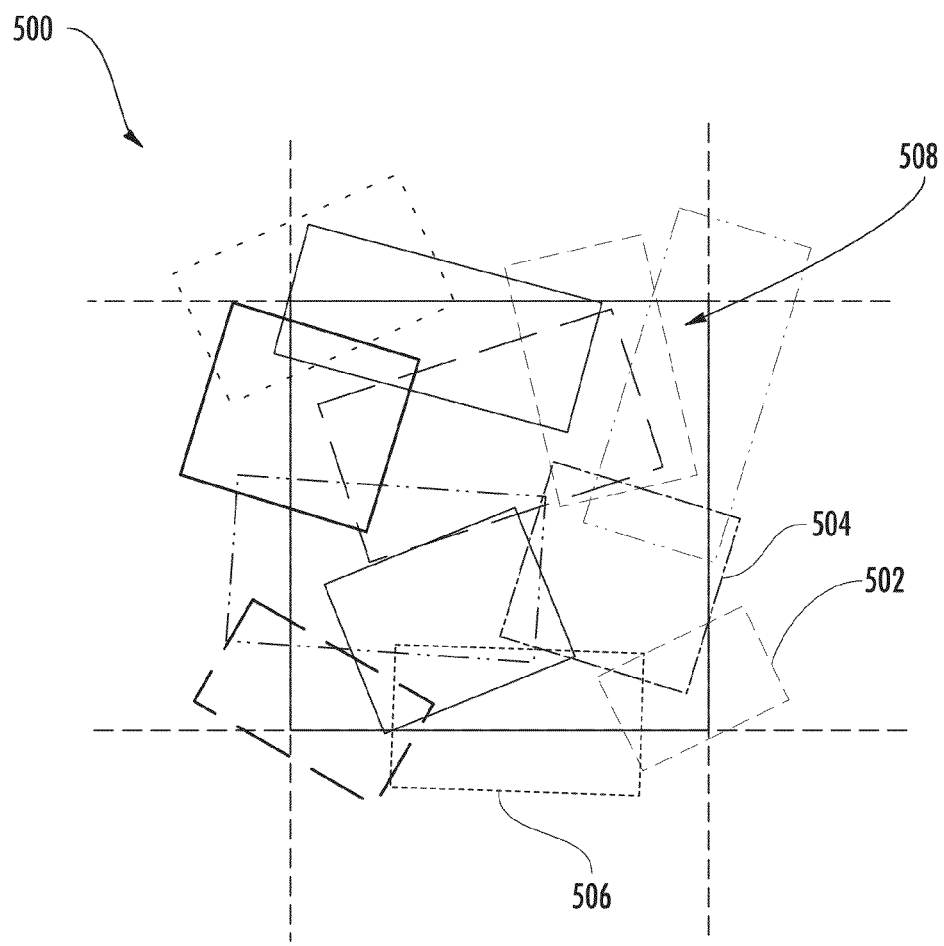
FIG. 5 depicts a simplified example representation of depth maps according to an example embodiment of the present disclosure.

As a simplified visual example, FIG. 5 depicts a simplified example representation 500 of depth maps according to an example embodiment of the present disclosure. For example, representation 500 includes depth maps 502, 504, and 506 that respectively correspond to portions of a scene zone 508.

According to an aspect of the present disclosure, the depth maps depicted in FIG. 5 can be organized into a plurality of pairs of depth maps, where each pair of depth maps exhibits some overlap. As an example, depth map 502 can be paired with depth map 504 and can be paired with depth map 506, as depth map 502 exhibits some respective overlap with depth maps 504 and 506. For each pair of depth maps, one map can be designated as a source map and the other map can be designated as a target map. The designations can be random or guided by certain criteria.

However, in other embodiments, overlap between depth maps is not required for such depth maps to be paired together. For example, in such embodiments, depth map 502 could be paired with other, non-overlapping depth maps.

According to another aspect, the present disclosure can be applied to respectively improve the alignment for each of a plurality of sets of depth maps that have been grouped based on various criteria. The sets of aligned depth maps can then be combined.

As an example, in the instance in which the present disclosure is applied to aerial images depicting a portion of the surface of the Earth, the portion of the surface of the Earth can be sectioned into a plurality of tiles. For example, each tile may correspond to a square mile or some other distance. Depth maps generated based on the aerial images can be grouped into a plurality of sets that respectively correspond to the plurality of tiles. For example, if a depth map depicts objects included in a tile, then the depth map can be included in the set for such tile.

Each set of depth maps can be aligned or otherwise processed according to the present disclosure. After alignment for each tile, interpolation can be used to combine the depth maps across all tiles to create a unified representation. For example, conflicting alignment results for a given depth map spanning multiple tiles can be interpolated. Thus, a local optimization (or improvement) and then global reconcilement strategy can be applied for large-scale reconstructions.

As an example, each of the plurality of depth maps depicted in FIG. 5 corresponds to some portion of a scene zone 508. Other sets of depth maps may correspond to a different scene zones that are adjacent to scene zone 508. The set of depth maps depicted in FIG. 5 can be aligned and then globally reconciled with the other sets of depth maps.

Furthermore, it should be appreciated that representation 500 is simplified for the purpose of providing examples and explanation of the present disclosure. Thus, although the depth maps depicted in FIG. 5 are two-dimensional in nature, the present disclosure can be applied to depth maps describing points in three-dimensional space. For example, each depth map can have a pose (e.g. position and orientation) in three-dimensional space and can provide a depth from such pose for each of the plurality of points. For example, a depth can be provided for each pixel of a depth map image. Thus, overlap exhibited between two depth maps can be three-dimensional in nature.

Figure 6:
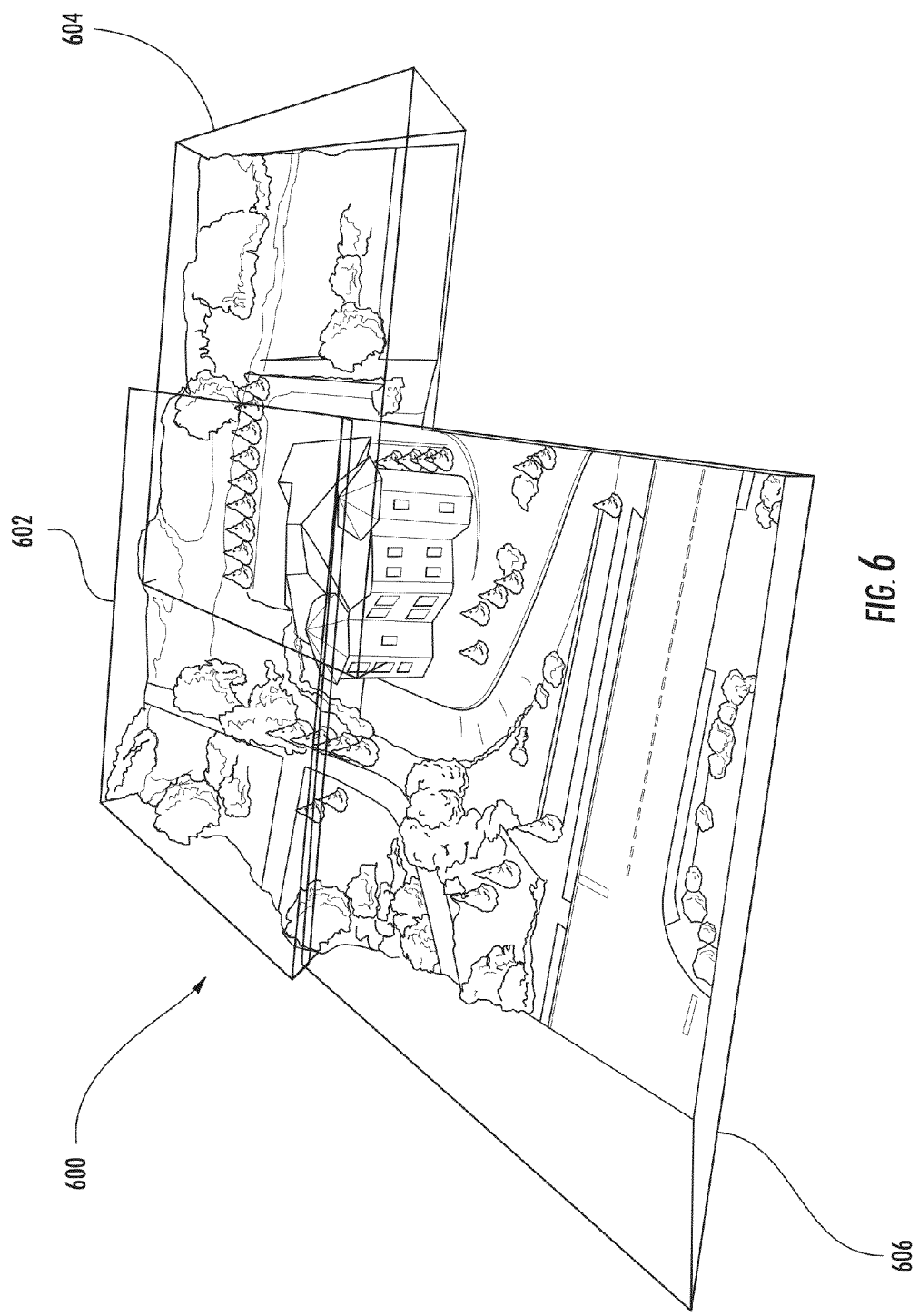
FIG. 6 depicts example depth maps according to an example embodiment of the present disclosure.

As an example, FIG. 6 depicts example depth maps according to an example embodiment of the present disclosure. In particular, graphical representation 600 depicts three-dimensional depth map volumes 602, 604, and 606 overlaid upon a three-dimensional model generated based on such depth maps.

Referring again to FIG. 4, in some embodiments, identifying the plurality of correspondences at (403) can include identifying, for each point in the source depth map, the closest point in the target depth map. In some embodiments, if no target depth map point is within a threshold distance from the source depth map point, then a correspondence does not exist for such source depth map point. In some embodiments, a reverse search can also be performed to determine whether the source depth map point is also the closest point for the identified target depth map point. If such condition is not true, for example, then the no correspondence is created. In some embodiments, a k-d tree can be used to accelerate the closest point search process.

At (404) an objective function can be minimized In particular, according to an aspect of the present disclosure, in some embodiments, all of the depth maps may be simultaneously aligned by minimizing an objective function. For example, the objective function can include a distance term that describes an alignment between all of the depth maps. As an example, in some embodiments, the objective function can include a distance term that considers all of the plurality of depth maps together by summing across the plurality of pairs of the depth maps. Thus, by minimizing the objective function, the alignment between all of the depth maps can be improved.

In some embodiments, the objective function minimized at (404) can include a distance term that is a sum, across all of the pairs of depth maps, of a plurality of squared point-to-plane distances respectively associated with the plurality of correspondences for each pair of depth maps. As an example, the distance term can be a sum, for all of the pairs of depth maps, of a plurality of squared distances respectively between one or more of the plurality of points described by the source depth map of each pair of depth maps and one or more planes respectively associated with one or more of the plurality of points described by the target depth map of such pair of depth maps. Thus, for each instance in which the objective function is minimized, the alignment can be simultaneously improved for all depth maps.

According to another aspect of the present disclosure, the objective function minimized at (404) can allow for simultaneous transformation of all of the plurality of depth maps. As an example, the target depth map can be permitted to be transformed in addition to transformation of the source depth map for each pair of depth maps. For example, the point-to-plane distances can be calculated based on a variable transformation of both the source depth map and the target depth map for each pair of depth maps. Thus, by minimizing the objective function, all of the depth maps may be simultaneously transformed to improve the alignment for all depth maps.

According to yet another aspect of the present disclosure, each depth map can be transformed relative to its own local coordinate system rather than a common global coordinate system. As an example, the source depth map and the target depth map can both be transformed in the distance term relative to their respective local coordinate systems and then converted from the local coordinate system to a global coordinate system. In such fashion, numerical instability can be reduced.

In some embodiments of the present disclosure, the distance term may be formulated as follows:

$$\sum_{s,d \in M, s \neq d} \sum_{i=0}^{N_{s,d}} (((T(r_s, t_s) * (p_s^i - o_s) + o_s) - (T(r_d, t_d) * (p_d^i - o_d) + o_d)) \cdot (T(r_d, t_d) * n_d^i))^2$$

where M is the set of depth maps being aligned;
$N_{s,d}$ is a number of point pairs between a source depth map s and a target depth map d;
$o_s$ is an origin of source depth map s;
$o_d$ is an origin of target depth map d;
$p_s^i$ and $p_d^i$ are the i-th point pair from source depth map s and target depth map d;
$n_d^i$ is a normal at point $p_d^i$;
$T(r_s, t_s)$ is a four by four transformation matrix for source depth map s; and
$T(r_d, t_d)$ is a four by four transformation matrix for target depth map d.

By summing for all pairs of depth maps in the set M, the particular example distance term provided above can consider all of the plurality of depth maps together. Thus, for each instance in which the objective function is minimized, the alignment can be simultaneously improved for all depth maps.

Furthermore, the particular example distance term provided above allows for simultaneous transformation of all of the plurality of depth maps. As an example, for each pair of depth maps, the target depth map is transformed by variable transformation matrix $T(r_d, t_d)$ in addition to the source depth map being transformed by variable transformation matrix $T(r_s, t_s)$.

In addition, by subtracting the origin for each point, transforming the point, and the resupplying the origin to the point, the particular example distance term transforms each depth map relative to its own local coordinate system rather than a common global coordinate system. In such fashion, numerical instability can be reduced.

Further, by taking the dot product with a transformed version of the normal for each target depth map point, the particular example distance term provided above can be a sum of a plurality of squared point-to-plane distances. The normal for each point can be determined based at least in part on changes in depth with respect to neighboring points from the same depth map.

According to another aspect of the present disclosure, the objective function can also include a regularization term. The regularization term can describe an amount of transformation (e.g. an amount of rotation and an amount of translation) applied to each of the plurality of depth maps. In particular, because each depth map is permitted to be transformed, the regularization term can be used to penalize and, therefore, reduce, global movement (e.g. global drift) across all depth maps.

In some embodiments of the present disclosure, the regularization term may be formulated as follows:

$$\sum_{m \in M} |r_m|^2 + |t_m|^2$$

where $r_m$ is an amount of rotation applied to a given depth map m; and
$t_m$ is an amount of translation applied to the given depth map m.

Furthermore, in some embodiments of the present disclosure, only a random subset of points described by each depth map can be considered by the objective function. For example, $N_{s,d}$ can be limited to a random subset of points described by source depth map s and the respective closest corresponding points in target depth map d.

By employing a random subset, the number of point pairs to be considered can be reduced, thereby reducing processing requirements and allowing application of the present disclosure to larger scale scenes.

In some embodiments, minimization of the objective function at (404) can be performed using a non-linear least squares solver. Alternatively, in some embodiments, the distance term can be linearized using the small-angle approximation.

In addition, it should be understood that, in some embodiments, minimization of the objective function at (404) does not require determination of an exact mathematical minimum. Instead, in such embodiments, the term "minimize" and "minimization" is used in a general sense to refer to reduction of the objective function residual value with the goal of identifying an improved alignment.

At (406) the plurality of depth maps can be transformed according to the minimized objective function. More particularly, by minimizing the objective function at (404) a plurality of transformations for the plurality of depth maps may be identified. Therefore, the transformations that minimize the objective function can be applied to the depth maps at (406). In some embodiments, (404) and (406) may be performed simultaneously or otherwise considered as a single step.

Figure 7A:
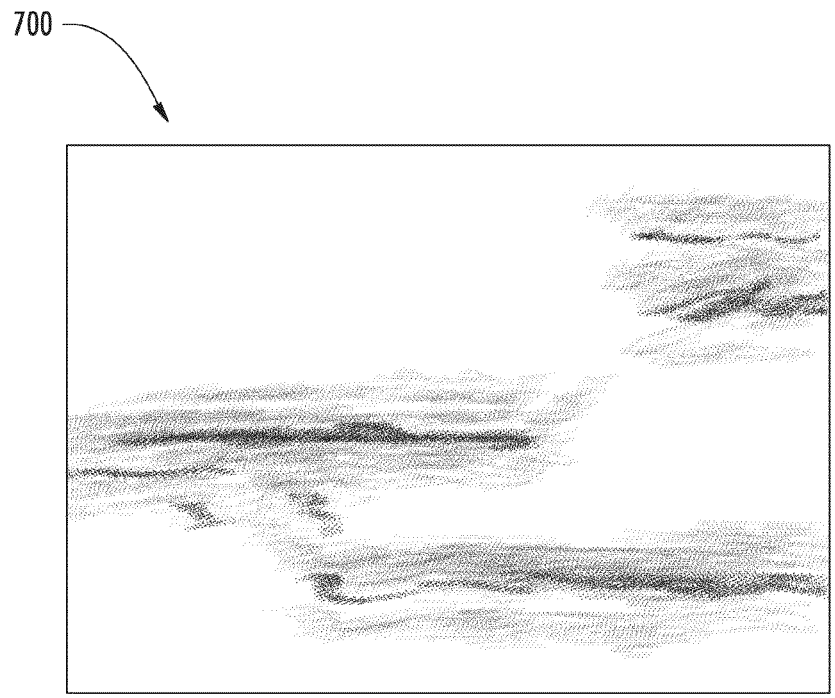
FIGS. 7A and 7B depict example three-dimensional point clouds according to an example embodiment of the present disclosure.
Figure 7B:
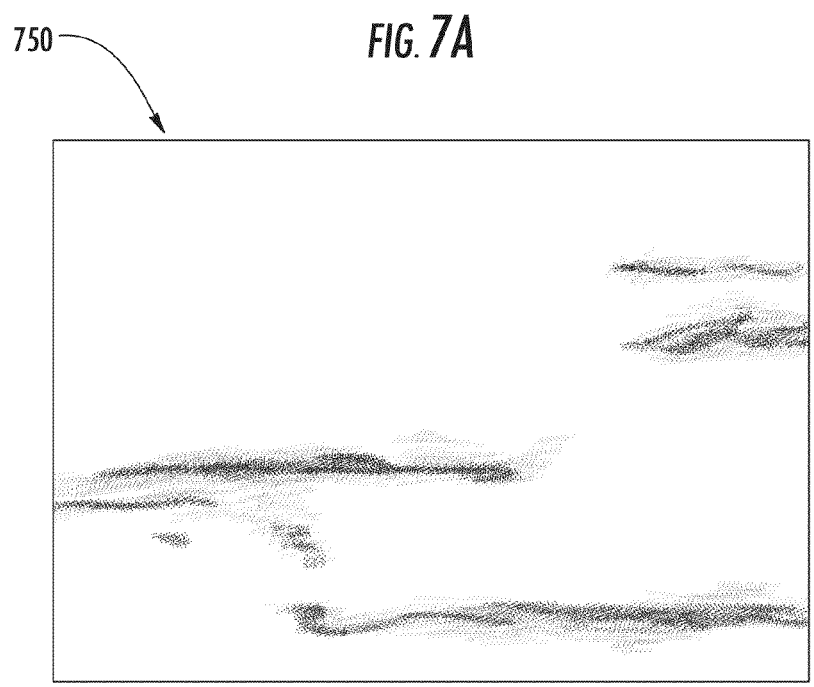

As a visual example of depth map alignment, FIGS. 7A and 7B depict example three-dimensional point clouds according to an example embodiment of the present disclosure. In particular, FIG. 7A includes a representation 700 of a plurality of depth maps prior to being aligned. Each depth map describes a plurality of points in three-dimensional space.

FIG. 7B includes a representation 750 of the plurality of depth maps subsequent to alignment. As can be seen in FIG. 7B, the respective pluralities of points corresponding to the depth maps demonstrate increased agreement and correspondence to each other.

Referring again to FIG. 4, at (408) it can be determined whether additional iterations should be performed. In particular, the iterative process can be ended according to various criteria. For example, a certain threshold number of iterations can be performed. After the threshold number is reached, method (400) can cease to perform additional iterations.

As another example, method (400) can cease to perform additional iterations when the residual is less than a threshold number. As yet another example, method (400) can cease to perform additional iterations when the iteration-over-iteration change in the residual is less than a threshold number. Other criteria or combinations of the above criteria can be used as well.

If it is determined at (408) that additional iterations should be performed, then method (400) can return to (403) and identify a new plurality of correspondences. Then, at (404) the objective function can be minimized again. In such fashion, the objective function can be iteratively minimized so as to iteratively improve the alignment of the depth maps.

However, if it is determined at (408) that additional iterations should not be performed, then method (400) can proceed to (410) and generate a three-dimensional model based on the depth maps.

In particular, referring again to FIG. 2, after the plurality of depth maps are aligned at (208), then at (210) one or more outlying points can be identified. For example, at (210) a pointwise outlier identification process can be performed. In particular, the outlier identification process can assist in reducing or otherwise correcting depth map errors introduced during stereo matching.

As an example, in some embodiments, outlying points can be identified at (210) by determining, for each point described by one of the plurality of depth maps, a number of points described by other depth maps that are within a threshold distance from such point. Outlying points can be identified based at least in part on such number of surrounding points.

In particular, as an example, if, for a given point, the number of surrounding points described by other depth maps is less than a threshold number, then such point can be identified as an outlying point.

As another example, a number of other depth maps represented by the surrounding points can be determined at (210). If, for a given point, the number of depth maps represented by points within a given distance is less than a threshold number, the point can be designated as an outlying point.

In some embodiments, outlying points can be removed. In other embodiments, a confidence score associated with each outlying point can be reduced by a certain percentage. The confidence scores can be employed in subsequent model construction steps (e.g. (212)). Therefore, reducing the confidence scores of outlying points can reduce their influence on resulting model.

Figure 11A:
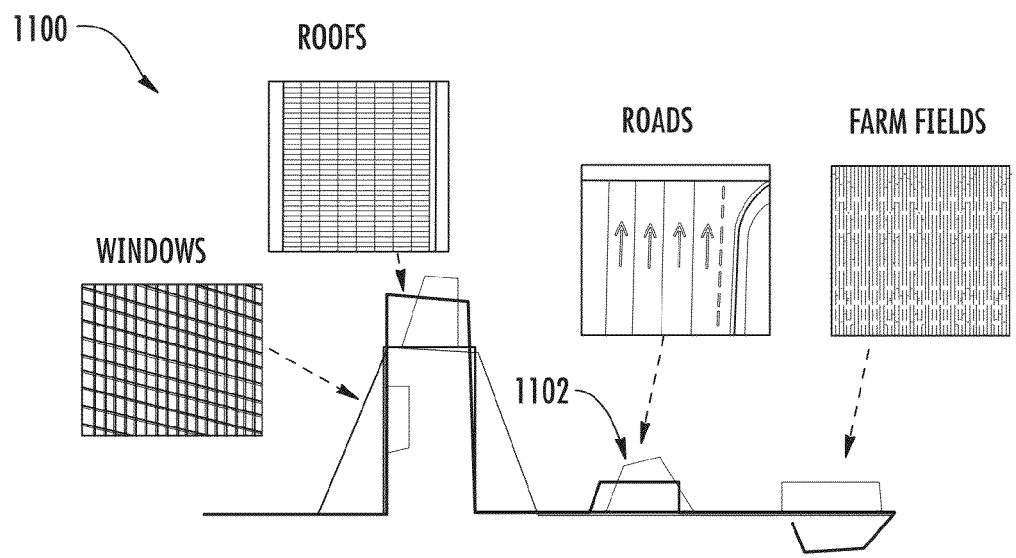
FIGS. 11A and 11B depict simplified example representations of outlying points according to an example embodiment of the present disclosure.
Figure 11B:
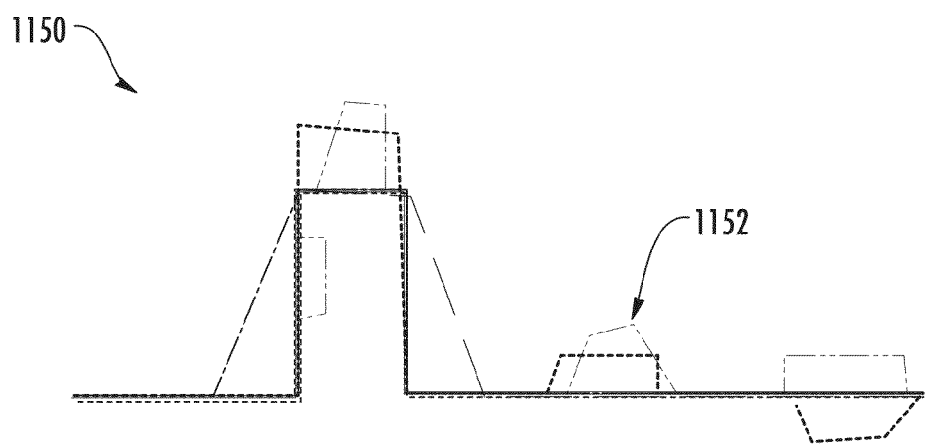

As a visual example, FIGS. 11A and 11B depict simplified example representations of outlying points according to an example embodiment of the present disclosure. FIG. 11A includes a simplified example representation 1100 that includes outlying points, such as, for example, portion 1102.

For example, objects that include repetitive and/or singular textures (e.g. windows, roofs, roads, farm fields, rail tracks, solar panels, etc.) are notorious for resulting in an increased incidence of errors by dense stereo algorithms. In particular, the dense stereo can struggle to resolve the disambiguity associated with repetitive patterns. As a result, the resulting depth maps can contain inaccurate, outlying regions, such as region 1102.

Therefore, the outlier identification techniques of the present disclosure can be performed to identify such inaccurate regions by verifying the agreement of each depth map point with its nearby points from other depth maps.

Once outliers are identified, their contribution to the final mesh can be downgraded or otherwise reduced or eliminated, resulting in more accurate three-dimensional surface reconstructions. As an example, as shown in simplified representation 1150 of FIG. 11B, the outlying region 1152 has been removed, resulting in a cleaner model surface.

It should be appreciated that representations 1100 and 1150 are simplified for the purpose of providing examples and explanation of the present disclosure. Thus, although the depth maps depicted in FIGS. 11A and 11B are two-dimensional in nature, the present disclosure can be applied to depth maps describing points in three-dimensional space. For example, each depth map can have a pose (e.g. position and orientation) in three-dimensional space and can provide a depth from such pose for each of the plurality of points. For example, a depth can be provided for each pixel of a depth map image.

Referring again FIG. 2, after depth map alignment at (208) and outlier identification at (210), a three-dimensional model can be generated based at least in part on the plurality of depth maps. In particular, at (212) a volumetric fusion technique can be performed to merge the plurality of depth maps. For example, the volumetric fusion technique performed at (212) can average a plurality of signed distance functions respectively associated with the plurality of depth maps to generate a unified signed distance function for a volume enclosing the scene.

As an example, the plurality of depth maps can be merged at (212) by averaging, for each of a plurality of locations (e.g. voxels in a volume), a plurality of voxel-to-surface distances respectively provided by the plurality of depth maps. For example, ray casting or other techniques can be used to determine a voxel-to-surface distance for each location for each depth map (e.g. by casting a ray from a perspective of each depth map in the direction of the voxel until it intersects a point described by such depth map and then determining a distance between the voxel and the intersected point). In some embodiments, interpolation of points can be performed if the ray does not directly intersect a point.

In addition, a weighted average can be used to average the voxel-to-surface distances at (212). In particular, the confidence scores of the points intersected by the rays can impact or be used as the weightings for the weighted average computation. Thus, the influence of outlying points on the resulting signed distance function can be reduced.

Other volumetric fusion techniques can be performed at (212) as well, including per-voxel Boolean voting schemes in which the weight of the vote provided by each depth map is influenced by the confidence scores.

After the depth maps have been merged at (212), at (214) a mesh model can be generated. For example, the mesh model can be generated at (214) based at least in part on a signed distance function generated at (212). As an example, marching cubes or other mesh modeling techniques can be performed to generate a three-dimensional polygonal mesh model.

At (216) the mesh model can be textured. For example, texture from the images can be applied to the mesh model. In some embodiments, updated poses for each of the images can be fed back from the aligned depth maps to improve the accuracy of the texturing. In other embodiments, poses can be scored based on the alignment results and the pose scores can be used to improve a graphcut texturing technique.

Thus, the present disclosure provides a novel pipeline for generating three-dimensional models from imagery. In particular, depth map alignment and outlier identification can be used to reduce errors introduced by previous pipeline steps. By improving the depth map alignment and reducing the influence of outliers, the resulting three-dimensional model will be more accurate, less noisy, and exhibit cleaner surfaces with fewer artifacts.

Figure 8A:
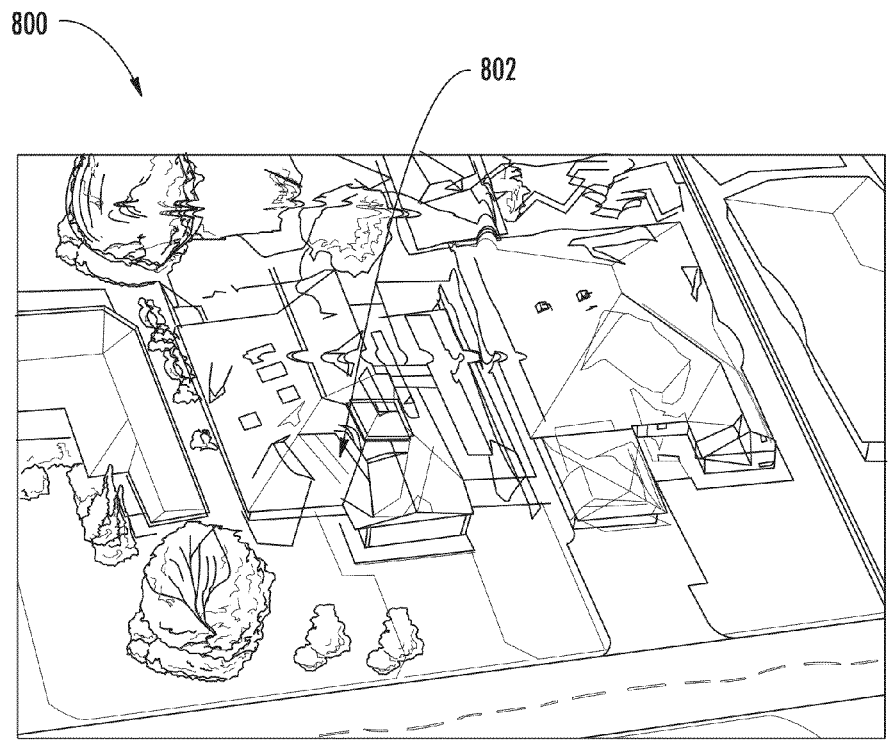
FIGS. 8A and 8B depict example renderings of three-dimensional models according to an example embodiment of the present disclosure.
Figure 8B:

As an example, FIGS. 8A and 8B depict example renderings of three-dimensional models according to an example embodiment of the present disclosure. In particular, FIG. 8A provides a rendering 800 of a model in which depth map alignment was not performed. As can be seen in rendering 800, the model exhibits significant noise and plane disagreement. For example, a roof 802 of a modeled house exhibits significant noise and contour inaccuracies.

Figure 9A:
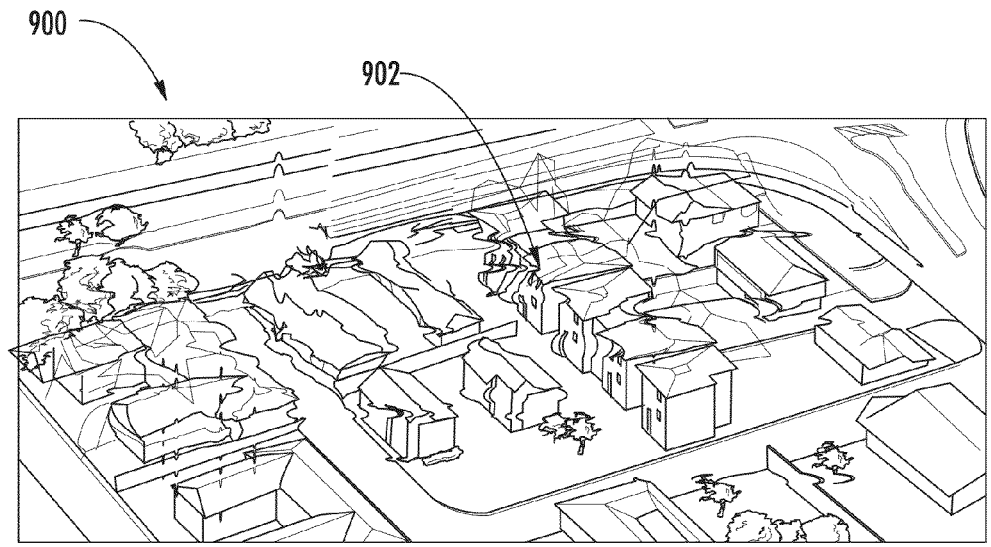
FIGS. 9A and 9B depict example renderings of three-dimensional models according to an example embodiment of the present disclosure.
Figure 9B:
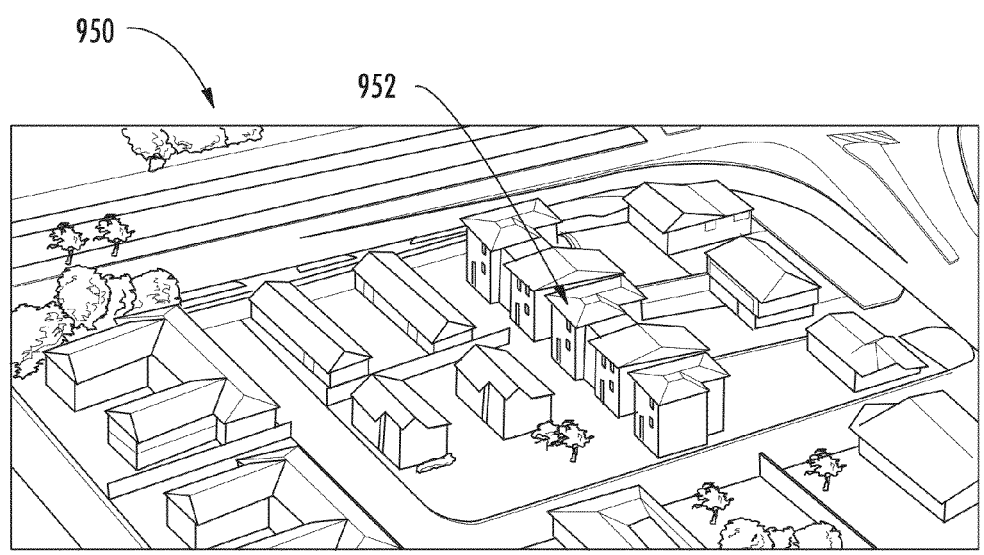

However, FIG. 8B provides a rendering 850 of a model in which depth map alignment was performed according to the present disclosure. As can be seen in rendering 850, the model exhibits significantly reduced noise with improved plane agreement. For example, the roof 852 of the modeled house is a much more accurate representation of the true shape of the roof As another example, FIGS. 9A and 9B depict example renderings of three-dimensional models according to an example embodiment of the present disclosure. In particular, FIG. 9A provides a rendering 900 of a model in which depth map alignment was not performed. As can be seen in rendering 900, the model exhibits significant noise and plane disagreement. For example, a row of structures 902 exhibit significant noise and contour inaccuracies.

However, FIG. 9B provides a rendering 950 of a model in which depth map alignment was performed according to the present disclosure. As can be seen in rendering 950, the model exhibits significantly reduced noise and improved plane agreement. For example, the row of structures 952 are a much more accurate representation of the true shape of the structures.

Figure 10A:
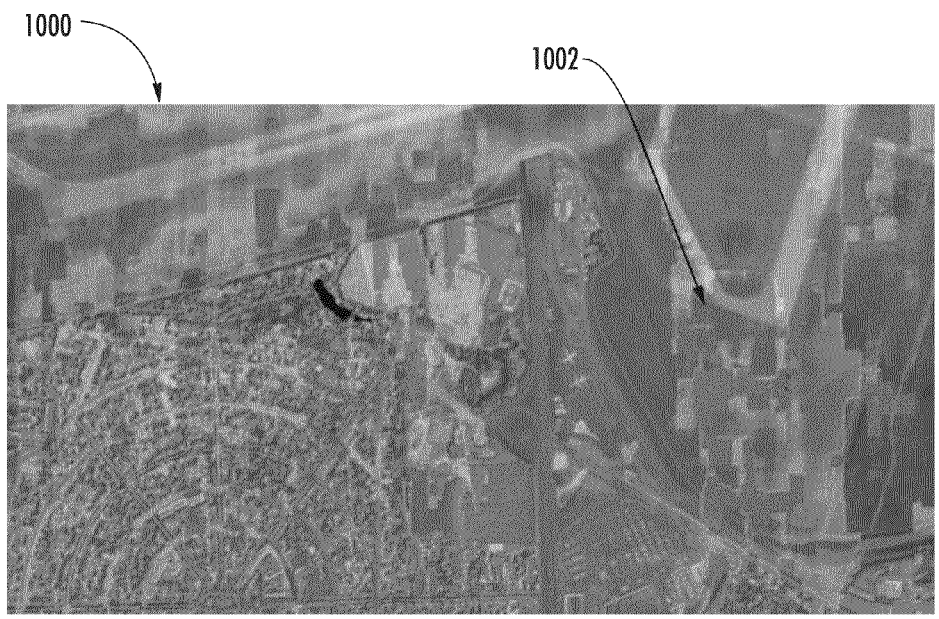
FIGS. 10A and 10B depict example representations of height information according to an example embodiment of the present disclosure.
Figure 10B:
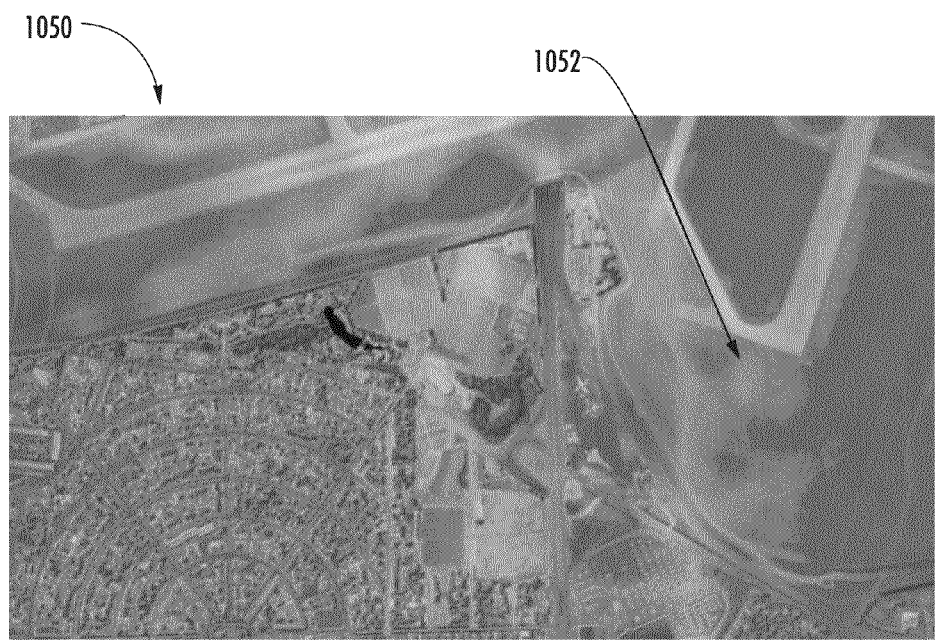

As yet another example, FIGS. 10A and 10B depict example representations of height information according to an example embodiment of the present disclosure. In particular, FIG. 10A provides a height data 1000 of a model in which depth map alignment was not performed. As can be seen from height data 1000, the model exhibits significant noise and plane disagreement. For example, a field of an airport 1002 exhibits significant noise and contour inaccuracies.

However, FIG. 10B provides height data 1050 of a model in which depth map alignment was performed according to the present disclosure. As can be seen from height data 1050, the model exhibits significantly reduced noise and improved plane agreement. For example, the field of the airport 1052 has a relatively continuous height that accurately models the true nature of the field.

Figure 12A:
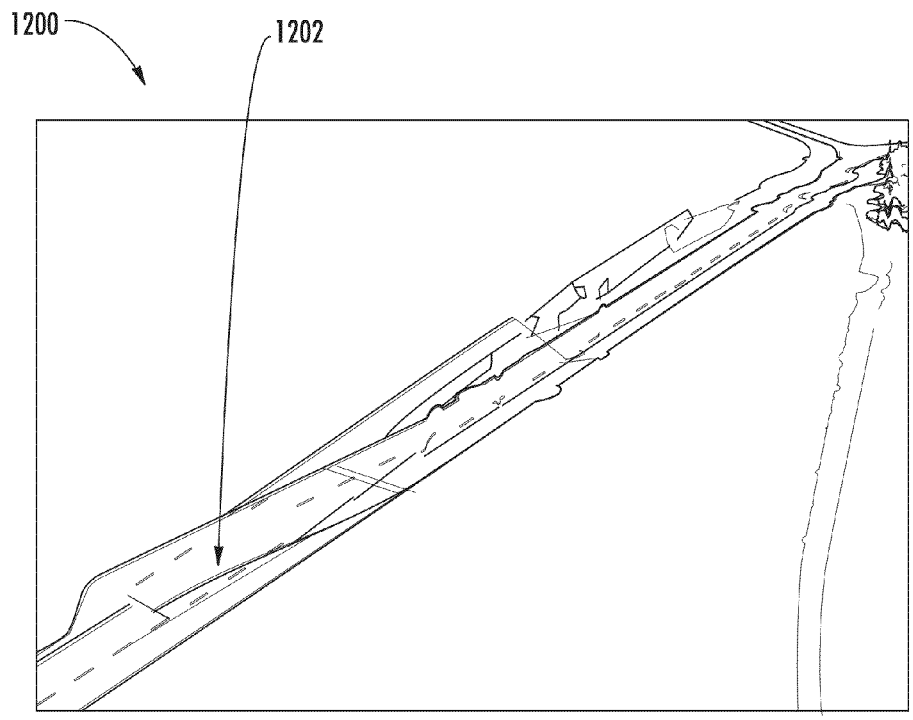
FIGS. 12A and 12B depict example renderings of three-dimensional models according to an example embodiment of the present disclosure.
Figure 12B:
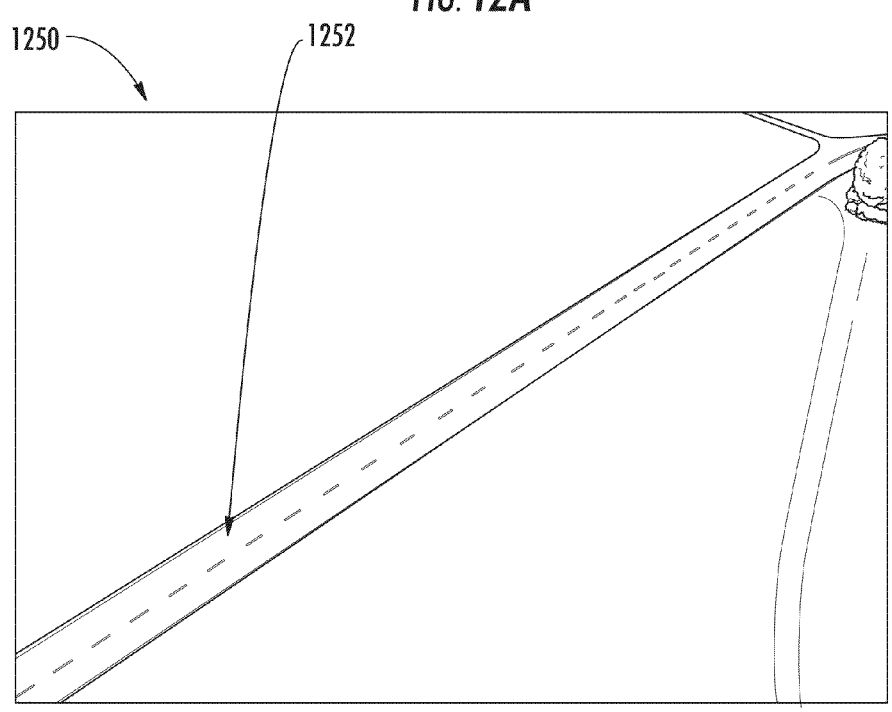

As another example, FIGS. 12A and 12B depict example renderings of three-dimensional models according to an example embodiment of the present disclosure. In particular, FIG. 12A provides a rendering 1200 of a model in which outlier identification was not performed. As can be seen in rendering 1200, the model exhibits significant noise including numerous outlying sections. For example, several portions of road 1202 are outlying sections with respect to the remainder of the scene.

However, FIG. 12B provides a rendering 1250 of a model in which outlier identification was performed according to the present disclosure. As can be seen in rendering 1250, the model exhibits significantly reduced noise and elimination of outlying regions. For example, the road 1252 is generally continuous and does not include outlying sections.

Figure 13A:
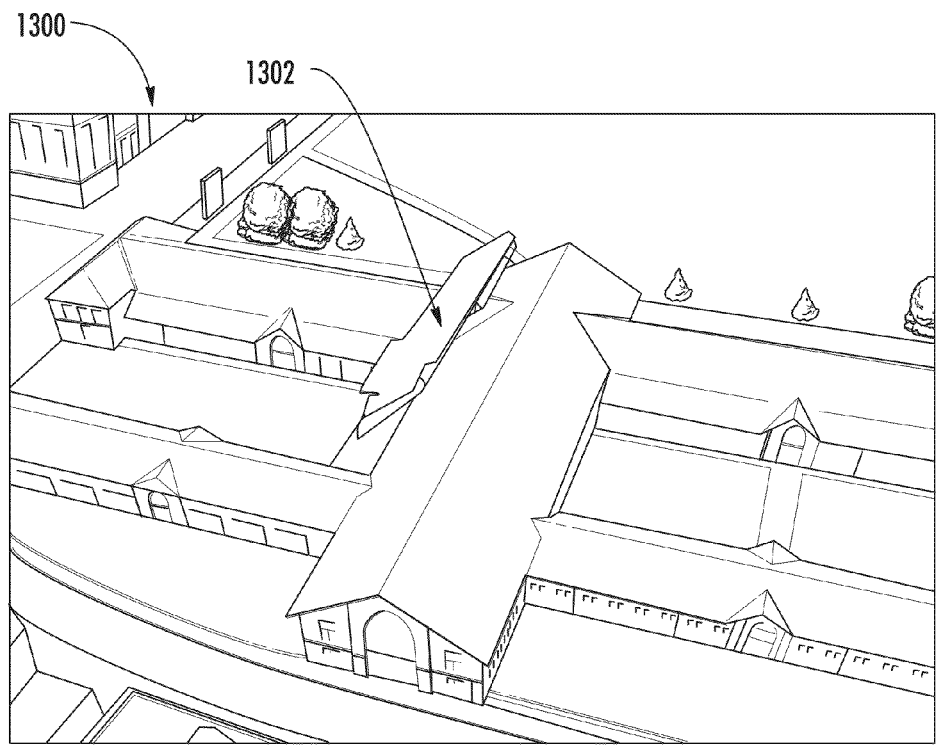
FIGS. 13A and 13B depict example renderings of three-dimensional models according to an example embodiment of the present disclosure.
Figure 13B:
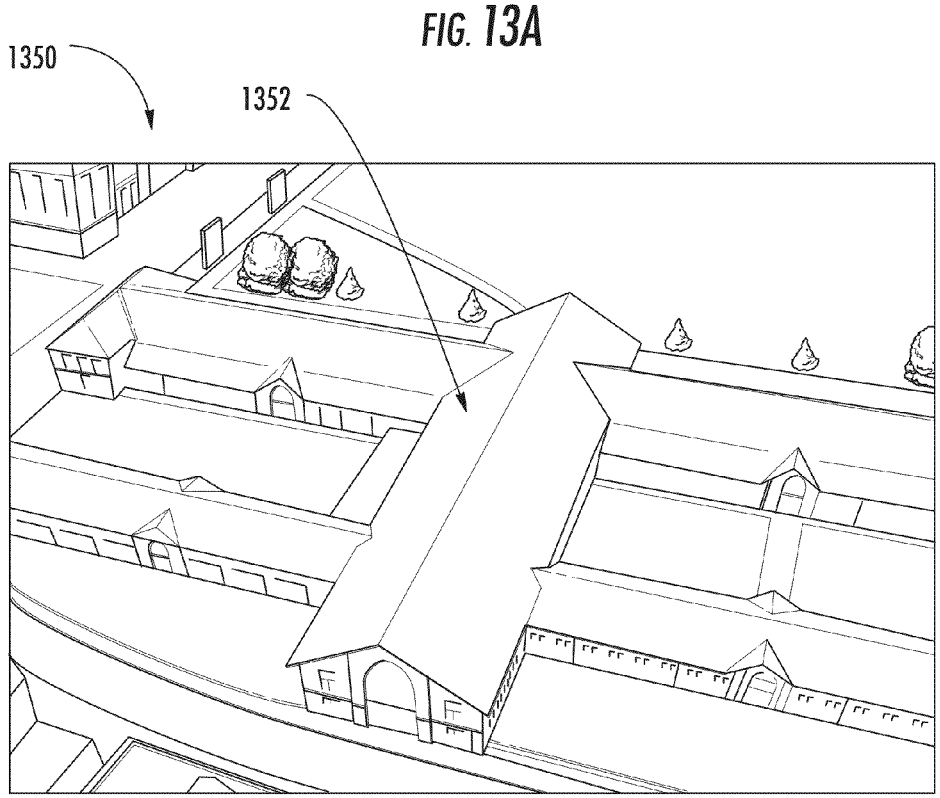

As yet another example, FIGS. 13A and 13B depict example renderings of three-dimensional models according to an example embodiment of the present disclosure. In particular, FIG. 13A provides a rendering 1300 of a model in which outlier identification was not performed. As can be seen in rendering 1300, the model exhibits significant noise, including an outlying portion 1302 of the roof of the modeled structure .

However, FIG. 13B provides a rendering 1350 of a model in which outlier identification was performed according to the present disclosure. As can be seen in rendering 1350, the model exhibits significantly reduced noise and elimination of outlying regions. For example, the outlying portion of the roof has been eliminated so that the roof 1352 is continuous in nature.

Example System

Figure 14:
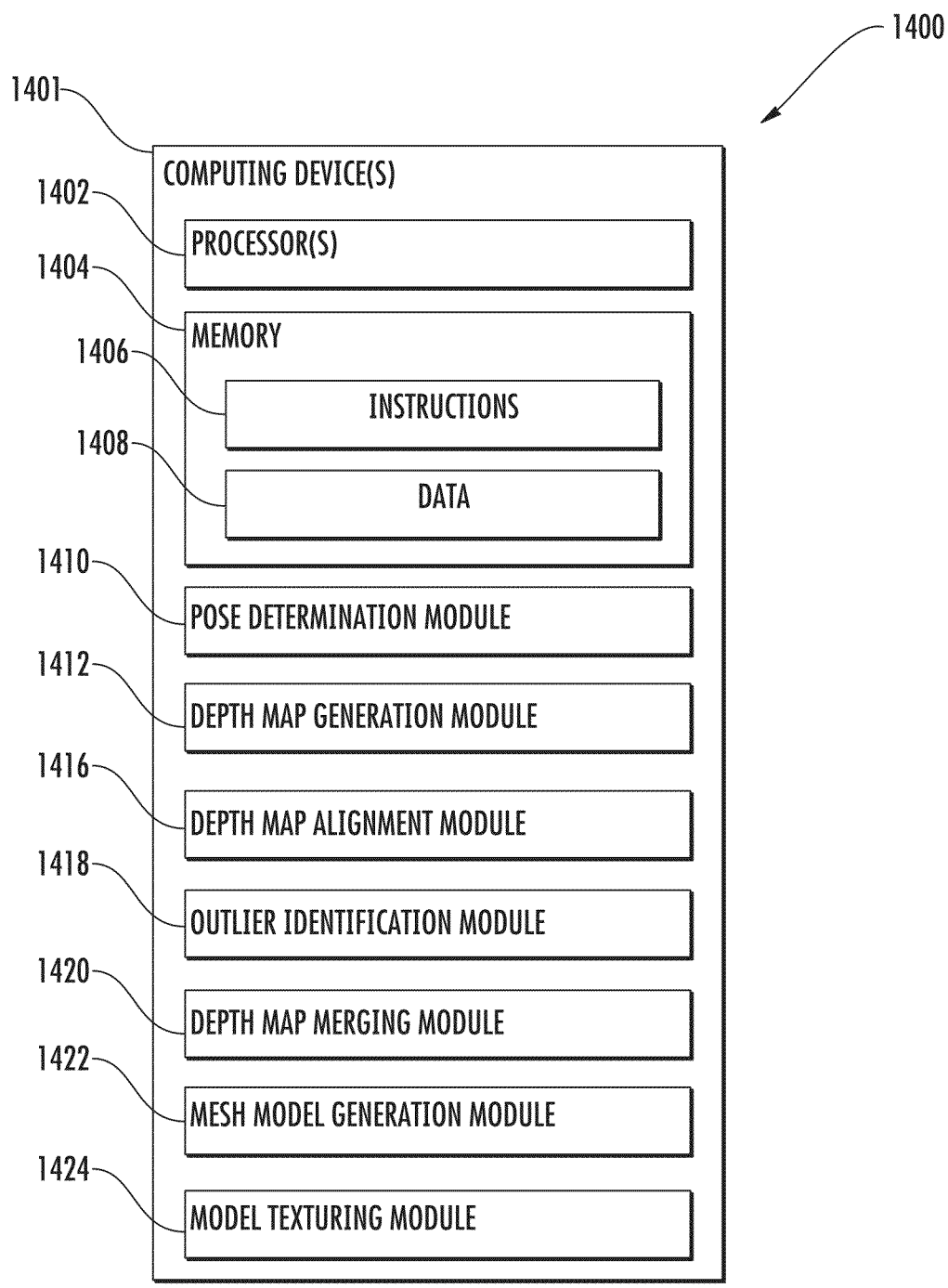
FIG. 14 depicts an example system for generating three-dimensional models according to an example embodiment of the present disclosure.

FIG. 14 depicts an example system 1400 for generating three-dimensional models according to an example embodiment of the present disclosure. System 1400 can include one or more computing devices 1401.

In the instance that system 1400 includes a plurality of computing devices 1401, the plurality of computing devices 1401 can perform any computing or processing operations according to any suitable computer architectures, including parallel computing architectures, sequential computing architectures, or some combination thereof.

Computing devices 1401 can include one or more processors 1402 and a memory 1404. The processor(s) 1402 can be any suitable processing device, such as a microprocessor, microcontroller, integrated circuit, or other suitable processing device. The memory 1404 can include any suitable computing system or media, including, but not limited to, non-transitory computer-readable media, RAM, ROM, hard drives, flash drives, or other memory devices, or combinations thereof. The memory 1404 can store information accessible by processor(s) 1402, including instructions 1406 that can be executed by processor(s) 1402. The instructions 1406 can be any set of instructions that when executed by the processor(s) 1402, cause the processor(s) 1402 to provide desired functionality. Memory 1404 can also store various forms of data 1408.

According to an aspect of the present disclosure, the one or more computing devices 1401 can include various modules that can be implemented to perform various respective tasks or operations. As an example, the one or more computing devices 1401 can include a pose determination module 1410; a depth map generation module 1412; a depth map alignment module 1416; and outlier identification module 1418; a depth map merging module 1420; a mesh model generation module 1422; and a model texturing module 1424.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Pose determination module 1410 can be implemented to determine a pose for each of a plurality of images. For example, the pose for each image can describe a location and orientation in three-dimensional space at which such image was captured. Pose determination module 1410 can obtain the pose for each image from the device of capture (e.g. if the camera or other image capture device had accurate knowledge of its pose at the time of capture) or can derive or otherwise improve the pose for each image through an analysis of the plurality of images.

As an example, in some embodiments, pose determination module 1410 can be implemented to perform a bundle adjustment algorithm to initially determine or refine the pose for each image. For example, pose determination module 1410 can use a structure-from-motion algorithm to solve for or otherwise determine a pose for each image based on two-dimensional feature matches. In some embodiments, both intrinsic and extrinsic camera parameters can be determined though bundle adjustment.

Depth map generation module 1412 can be implemented to determine a depth map for each of the plurality of images. In particular, the depth map determined for each image can inherit the pose from such image. Further, each depth map can describe a plurality of points in three-dimensional space that correspond to objects in the scene. For example, each depth map can provide a depth for each of a plurality of points (e.g. for each of the pixels of the corresponding image) relative to the pose associated with such depth map.

As an example, depth map generation module 1412 can be implemented to perform a dense stereo algorithm to obtain a depth map for each image. For example, the dense stereo algorithm can include or leverage a graph cutting algorithm or a plane-sweep stereo algorithm.

Depth map alignment module 1416 can be implemented to align a plurality of depth maps. In particular, depth map alignment module 1416 can transform (e.g. rotate and/or translate within six degrees of freedom) one or more of the depth maps to improve the alignment among the depth maps.

As an example, in some embodiments, depth map alignment module 1416 can be implemented to iteratively minimize an objective function to iteratively improve an alignment between the plurality of depth maps. For example, depth map alignment module 1416 can perform a customized variant of an iterative closest point optimization (or improvement) technique to align the depth maps. In some embodiments, depth map alignment module 1416 can be implemented to perform some or all of method (400) of FIG. 4.

Outlier identification module 1418 can be implemented to identify one or more outlying points. For example, outlier identification module 1418 can be implemented to perform a pointwise outlier identification process to identify outlying points. In some embodiments, a confidence score associated with each outlying point can be reduced by a certain percentage. The confidence scores can be employed by additional modules, including, for example, depth map merging module 1420.

Depth map merging module 1420 can be implemented to merge a plurality of depth maps. For example, depth map merging module 1420 can be implemented to perform a volumetric fusion technique to merge the plurality of depth maps. In particular, as an example, a weighted average of a plurality of voxel-to-surface distances respectively provided by the plurality of depth maps for each of a plurality of locations can be determined to create a signed distance function for a volume enclosing the scene. The weightings used can be influenced by or otherwise dependent upon confidence scores associated with points used by each depth map to provide the voxel-to-surface distance for each location.

Mesh model generation module 1422 can be implemented to generate a mesh model of a scene. As an example, mesh model generation module 1422 can be implemented to perform marching cubes or other mesh modeling techniques (e.g. marching tetrahedra) to generate a three-dimensional polygonal mesh model.

Model texturing module 1424 can be implemented to texture a mesh model of a scene. For example, texture from the images can be applied to the mesh model. In some embodiments, updated poses for each of the images can be fed back from the aligned depth maps to improve the accuracy of the texturing. In other embodiments, poses can be scored based on the alignment results and the pose scores can be used to improve a graphcut texturing technique.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent to one of ordinary skill in the art.

What is claimed is:

1. A computer-implemented method for generating three-dimensional models, the method comprising:

obtaining, by one or more computing devices, a plurality of images depicting a scene;

determining, by the one or more computing devices, a pose for each of the plurality of images;

determining, by the one or more computing devices, a depth map for each of the plurality of images such that a plurality of depth maps are determined, wherein each of the plurality of depth maps describes a plurality of points in three-dimensional space that correspond to objects in the scene;

aligning, by the one or more computing devices, the plurality of depth maps by transforming one or more of the plurality of depth maps so as to improve an alignment between the plurality of depth maps;

after aligning the plurality of depth maps, identifying, by the one or more computing devices, one or more of the plurality of points described by one or more of the plurality of depth maps as one or more outlying points; and
generating, by the one or more computing devices, a three-dimensional model of the scene based at least in part on the plurality of aligned depth maps.

2. The computer-implemented method of claim 1, wherein identifying, by the one or more computing devices, one or more of the plurality of points described by one or more of the plurality of depth maps as one or more outlying points comprises:
determining, by the one or more computing devices for each point described by one of the plurality of depth maps, a number of points described by other depth maps that are within a threshold distance from such point; and
determining, by the one or more computing devices for each point described by one of the plurality of depth maps, whether such point is an outlying point based at least in part on the number of points described by other depth maps that are within a threshold distance from such point.

3. The computer-implemented method of claim 2, wherein determining, by the one or more computing devices for each point described by one of the plurality of depth maps, whether such point is an outlier based at least in part on the number of points described by other depth maps that are within a threshold distance from such point comprises:
determining, by the one or more computing devices for each point described by one of the plurality of depth maps, a number of other depth maps represented by the number of points described by other depth maps that are within a threshold distance from such point; and
determining, by the one or more computing devices for each point described by one of the plurality of depth maps, whether such point is an outlier based at least in part on the number of other depth maps represented by the number of points described by other depth maps that are within a threshold distance from such point.

4. The computer-implemented method of claim 1, further comprising reducing one or more confidence scores respectively associated with the one or more outlying points, wherein the confidence scores are used as weightings for a volumetric fusion technique performed to merge the plurality of depth maps.

5. The computer-implemented method of claim 1, wherein aligning, by the one or more computing devices, the plurality of depth maps by transforming one or more of the plurality of depth maps so as to improve the alignment between the plurality of depth maps comprises transforming, by the one or more computing devices, one or more of the plurality of depth maps so as to minimize an objective function describing the alignment between the plurality of depth maps.

6. The computer-implemented method of claim 5, wherein:
the objective function comprises a distance term;
the plurality of depth maps comprise a plurality of pairs of depth maps, wherein each pair of depth maps comprises a source depth map and a target depth map, and wherein the source depth map and the target depth map for each pair of depth maps exhibit an overlap with respect to one another; and
the distance term comprises a sum, for all of the plurality of pairs of depth maps, of a plurality of squared distances respectively between one or more of the plurality of points described by the source depth map of each pair of depth maps and one or more planes respectively associated with one or more of the plurality of points described by the target depth map of such pair of depth maps.

7. The computer-implemented method of claim 6, wherein the distance term allows for transformation of both the source depth map and the target depth map for each pair of depth maps.

8. The computer-implemented method of claim 7, wherein:
each of the plurality of depth maps describe their respective plurality of points in three-dimensional space according to a local coordinate system; and
the source depth map and the target depth map are both transformed in the distance term relative to their respective local coordinate systems.

9. The computer-implemented method of claim 6, wherein:
the one or more of the plurality of points described by the source depth map comprise a random subset of the plurality of points described by the source depth map; and
the one or more planes respectively associated with the one or more of the plurality of points described by the target depth map comprise planes respectively associated with a plurality of closest points of the source depth map that are respectively closest to the random subset of the plurality of points described by the source depth map.

10. The computer-implemented method of claim 5, wherein:
the objective function comprises a distance term; and
the distance term comprises a sum of a plurality of squared point-to-plane distances respectively associated with at least one of the plurality of points from each of the plurality of depth maps and a plane associated with at least one of the plurality of points for at least one of the other depth maps.

11. The computer-implemented method of claim 5, wherein transforming, by the one or more computing devices, one or more of the plurality of depth maps so as to minimize the objective function describing the alignment between the plurality of depth maps comprises iteratively minimizing, by the one or more computing devices, the objective function, wherein the objective function allows for transformation of all of the plurality of depth maps, such that each of the plurality of depth maps is iteratively transformed to improve the alignment.

12. The computer-implemented method of claim 5, wherein:
the objective function comprises a regularization term; and
the regularization term describes an amount of transformation performed for each of the plurality of depth maps.

13. The computer-implemented method of claim 1, wherein generating, by the one or more computing devices, the three-dimensional model of the scene based at least in part on the plurality of depth maps comprises:
merging, by the one or more computing devices, the plurality of depth maps to create a signed distance function, wherein the merging comprises determining, for each of a plurality of voxels included in a volume, a weighted average of a plurality of voxel-to-surface distances respectively provided by the plurality of depth maps, and wherein a weighting provided for each depth map is determined based at least in part on whether one of the outlying points was used to determine the voxel-to-surface distance provided by such depth map; and
generating, by the one or more computing devices, a mesh model of the scene based at least in part on the signed distance function.

14. One or more non-transitory computer-readable media storing instructions that, when executed by one or more processors, cause the one or more processors to perform operations, the operations comprising:

obtaining a plurality of depth maps, each of the plurality of depth maps describing a plurality of points in three-dimensional space that respectively correspond to locations of objects in a scene;

iteratively transforming the plurality of depth maps to iteratively minimize an objective function, such that an alignment of the plurality of depth maps is improved;

identifying one or more of the plurality of points of one or more of the plurality of depth maps as outlying points; and reducing an influence of each of the outlying points on the generation of a three-dimensional model from the plurality of depth maps;

wherein the objective function comprises a sum, for all of a plurality of pairs of the depth maps that overlap one another, of a plurality of squared distances respectively between one or more of the plurality of points described by a source depth map of each pair of depth maps and one or more planes respectively associated with one or more of the plurality of points described by a target depth map of such pair of depth maps; and wherein the objective function allows for transformation of both the source depth map and the target depth map for each pair of depth maps.

15. The one or more non-transitory computer-readable media of claim 14, wherein reducing the influence of each of the outlying points on the generation of the three-dimensional model from the plurality of depth maps comprises:

removing each of the outlying points, such that the outlying points do not impact the generation of the three-dimensional model from the plurality of depth maps.

16. The one or more non-transitory computer-readable media of claim 14, wherein reducing the influence of each of the outlying points on the generation of the three-dimensional model from the plurality of depth maps comprises:

reducing a confidence score associated with each of the outlying points;

wherein the confidence scores impact weightings used by a volumetric fusion technique performed to merge the plurality of depth maps into a signed distance function.

17. The one or more non-transitory computer-readable media of claim 14, wherein:

each of the plurality of depth maps describe their respective plurality of points in three-dimensional space according to a local coordinate system; and the source depth map and the target depth map are both transformed in the objective function relative to their respective local coordinate systems.

18. A computing system comprising:

one or more computing devices respectively comprising one or more processors; and one or more non-transitory computer-readable media storing instructions that, when executed by the one or more processors, cause the one or more computing devices to perform operations, the operations comprising:

bundle adjusting a plurality of images depicting a scene to obtain a pose for each image;

performing a stereo algorithm to obtain a depth map for each image, such that a plurality of depth maps are obtained, wherein each depth map describes locations of a plurality of points in three-dimensional space;

aligning the plurality of depth maps by iteratively minimizing an objective function, wherein the objective function comprises a distance term that sums, for all of the plurality of depth maps, a plurality of squared point-to-plane distances, and wherein the distance term allows transformation of both a source depth map and a target depth map for each of a plurality of pairs of the depth maps;

identifying one or more of the plurality of points described by one or more of the plurality of depth maps as outlying points;

reducing a confidence score associated with each of the outlying points;

merging the plurality of aligned depth maps to generate a signed distance function for the scene, wherein the merging is based at least in part on the confidence scores; and generating a mesh model of the scene based at least in part on the signed distance function.

19. The computing system of claim 18, wherein:

each of the plurality of depth maps describe their respective plurality of points in three-dimensional space according to a local coordinate system; and the source depth map and the target depth map are both transformed in the distance term relative to their respective local coordinate systems.

20. The computing system of claim 18, wherein the objective function further comprises a regularization term that describes an amount of rotation applied to each of the plurality of depth maps and an amount of translation applied to each of the plurality of depth maps.

* * * * *